United States Patent
Nakamura et al.

(10) Patent No.: US 6,568,855 B2
(45) Date of Patent: May 27, 2003

(54) ROLLING BEARING UNIT WITH ROTATION SPEED DETECTION INSTRUMENT FOR USE IN CARS AND METHOD FOR WORKING OUTER RACE FOR USE IN THIS BEARING UNIT

(75) Inventors: Yuji Nakamura, Kanagawa-ken (JP); Hiroya Miyazaki, Kanagawa-ken (JP); Shuichi Ishikawa, Kanagawa-ken (JP)

(73) Assignee: NSK Ltd., Tokyo (JP)

( * ) Notice: Subject to any disclaimer, the term of this patent is extended or adjusted under 35 U.S.C. 154(b) by 23 days.

(21) Appl. No.: 09/901,123

(22) Filed: Jul. 10, 2001

(65) Prior Publication Data

US 2002/0126925 A1 Sep. 12, 2002

Related U.S. Application Data

(62) Division of application No. 09/262,022, filed on Mar. 4, 1999.

(30) Foreign Application Priority Data

| Mar. 6, 1998 | (JP) | ............................................. 10-054576 |
| Mar. 9, 1998 | (JP) | ............................................. 10-057102 |
| May 11, 1998 | (JP) | ............................................. 10-127725 |

(51) Int. Cl.[7] ............................................. F16C 19/08
(52) U.S. Cl. ...................................... 384/448; 384/625
(58) Field of Search ................................ 384/448, 625; 324/174; 29/898.13

(56) References Cited

U.S. PATENT DOCUMENTS

| 4,172,621 | A | * | 10/1979 | Yoshida ........................ 384/563 |
| 4,778,286 | A | | 10/1988 | Kadokawa ................... 384/446 |
| 5,085,519 | A | | 2/1992 | Dougherty ................... 384/448 |
| 5,129,742 | A | * | 7/1992 | Tilch et al. .................. 384/448 |
| 5,618,114 | A | * | 4/1997 | Katahira ..................... 384/625 |
| 5,727,317 | A | * | 3/1998 | Bekku et al. ............ 29/898.06 |
| 6,089,757 | A | * | 7/2000 | Ouchi ........................ 384/448 |
| 6,280,093 | B1 | * | 8/2001 | Ohtsuki et al. ............. 384/625 |

FOREIGN PATENT DOCUMENTS

| DE | 39 26 803 | 2/1991 |
| DE | 196 12 162 | 10/1996 |
| EP | 0 291 138 | 11/1988 |
| EP | 0 667 530 | 8/1995 |
| EP | 0 718 513 | 6/1996 |
| GB | 2 270 087 | 3/1994 |
| JP | 8-270659 | 10/1996 |
| JP | 9-4642 | 1/1997 |

* cited by examiner

Primary Examiner—Sherry Estremsky
(74) Attorney, Agent, or Firm—Crowell & Moring LLP

(57) ABSTRACT

A rolling bearing unit with a rotation speed detection instrument having a hub with a plurality of inner race tracks, an outer race formed of steel material with a plurality of outer race tracks, rolling elements between the tracks, and encoder on the hub and a sensor supported in a mounting hole in the outer race. A hardened layer is formed on the inner surface of the outer race and each portion where the outer race tracks are formed. An area of the inner surface around the mounting hole is not hardened.

2 Claims, 20 Drawing Sheets

ROLLING BEARING UNIT WITH ROTATION SPEED DETECTION INSTRUMENT FOR USE IN CARS AND METHOD FOR WORKING OUTER RACE FOR USE IN THIS BEARING UNIT

This application is a division of application Ser. No. 09/262,022, filed Mar. 4, 1999.

This application claims the benefits of Japanese Application Nos. 10-54576, 10-57102 and 10-127725 which are hereby incorporated by reference.

BACKGROUND OF THE INVENTION

1. Field of the Invention

The present invention relates to a rolling bearing unit with a rotation speed detection instrument for use in cars, and to a method for working an outer race for use in the bearing unit.

Particularly, the present invention relates to improvements in a rolling bearing unit with a rotation speed detection instrument which allows a wheel of a car to be supported ratatably on a suspension device thereof and which is used to detect a rotation speed of the wheel, as well as to an outer race constituting the rolling bearing unit with the rotation speed detection instrument.

2. Related Background Art

For rotatably supporting a wheel of a car onto a suspension device, a rolling bearing unit is used. The rotation speed of the wheel must be detected to control an antilock braking system (ABS) as well as a traction control system (TCS). For this reason, it has been widely performed that the foregoing wheel is rotatably supported onto the suspension device by a rolling bearing unit with a rotation speed detection instrument which is built therein and the rotation speed is detected.

Such rolling bearing unit with a rotation speed detection instrument supports a hub on the inner diameter side of its outer race rotatably interposing a plurality of rolling elements between the outer race and the hub.

At the same time, the rotation speed of an encoder fixed to a portion of the hub is detected by a sensor which is supported by a portion of the outer race. The characteristic of the encoder in the circumference direction is changed alternately at equal intervals. Moreover, the technology that the detection portion of the sensor is made to face the outer peripheral surface of a large diameter cylindrical portion of the encoder at a situation where the sensor is supported in a mounting hole formed at an intermediate portion of the outer race in its axial direction and to be elongated in the diameter direction of the outer race, has been widely known as disclosed in, for example, Japanese Patent Laid-open No. 63-59769, 6-109027, 8-270659, and many publications.

When the rolling bearing unit with the rotation speed detection instrument as described above is used, the foregoing outer race is supported on the suspension device, the wheel is fixed to the end portion of the hub, which portion is located a part from the outer race, thereby the wheel being supported rotatably on the foregoing suspension device. When the foregoing encoder rotates with the rotation of the wheel, the output of the sensor having the detection portion facing the encoder changes. The frequency in which the output of the sensor changes is proportional to the rotation speed of the wheel. Therefore, if the output signal of the sensor is sent to a controller which obtains the rotation speed of the wheel, the ABS as well as the TCS can be controlled suitably.

In the case of the rolling bearing unit with the rotation speed detection device described in the foregoing gazettes, no consideration for the compatibility of the workability of the mounting hole with a security of the durability of the outer race was made. Specifically, in order to secure the rolling fatigue life time of the track or raceway of the outer race, a hardened layer having the hardness more than 500 Hv must be formed in the inner peripheral surface of the enter race, and in the surface of the outer race where the outer race tracks are formed and in the vicinity of that surface. This layer is formed to a depth (about 1.5 mm in the case of the rolling bearing unit of cars) more than three times inclusive of three times as large as a depth where a shearing force based on a stress applied by the rolling element becomes maximum (about 0.5 mm in the case of the rolling bearing unit of cars). A transition layer of about 0.5 mm thick exists between the deepest portion of this hardened layer and its so-called raw portion which is not hardened. In this transition layer portion, the hardness gradually decreases from the hardened layer to the raw portion.

In order to form the hardened layer in each of the outer race track portion, although the control of the hardening depth with respect to the thickness direction was considered, the regulation of the formation range of the hardened layer in the surface direction of the inner periphery of the outer race, particularly, in the axial direction, was not considered. Specifically, with respect to the thickness direction, in order to secure the toughness of the outer race, although to leave the raw portion in the vicinity of the outer periphery of the outer race was considered (see, for example, Utility Model Gazette No. 2529597), the consideration in the surface direction was not considered. As described above, when the thickness direction of the hardened layer is considered concerning the range of the hardened layer and the hardened layer is formed in each of the foregoing outer race track portions without considering the surface direction of the hardened layer, the range of the hardened layer may reach to about 10 mm from the end portion of each outer race track or more. The hardness of the hardened layer becomes high in the portion of about 10.5 mm or more apart from the end of each outer race track.

On the other hand, in response to the demand for saving fuel consumption of the cars in recent years, to downsize the rolling bearing unit for supporting the wheel and to reduce a weight of it, the shortening of the dimension of this rolling bearing unit in the axial direction has been developed. Based on such shortening, the distance between the end periphery of each outer race track portion and the mounting hole becomes short, and this distance sometimes can not be kept to be more than 10.5 mm. For this reason, the hardness in the portion where the foregoing mounting hole is to be formed becomes high too, so that working of this mounting hole will be cumbersome. Although the working of this mounting hole may be well performed before the formation of the hardened layer in each outer race track portion, when the hardened treatment is performed after the working of the mounting hole, the considerations for preventing the occurrence of defects due to stress concentration in the mounting hole portion is needed, resulting in troublesomeness of the hardening treatment.

Furthermore, in Utility Model Gazette No. 2529597, the technology is disclosed, in which the hardened layer is formed also in a portion between a plurality of the outer race tracks of the outer race in a part of the inner peripheral surface of the outer race, and the portion between the outer race tracks is made to be not liable to occur a plastic deformation. As described above, when the portion between the outer race tracks is made to be not liable to occur the plastic deformation, the plastic deformation of the outer race is prevented, so that an increase in durability of the rolling bearing unit with the rotation speed detection instrument including this outer race can be achieved, in spite of the fact that an impact load is applied to the outer race due to crashing of the wheel to paving stones. It should be noted that even in such case, toughness of the outer race is secured while leaving a raw portion that is not hardened in the vicinity of the outer periphery of the outer race and occurrence of damages of the outer race such as cracks due to the application of the foregoing impact load can be prevented.

However, when the hardened layer is formed also between the outer race tracks in the part of the inner peripheral surface of the outer race, working of the mounting hole to fixedly support the sensor, which is formed in the outer race, becomes difficult.

On the other hand, in response to the demand for saving fuel consumption of the cars in recent years, to downsize the rolling bearing unit for supporting the wheel and to reduce a weight of it, the shortening of the dimension of this rolling bearing unit in the axial direction has been developed. Based on such shortening, the distance between the end periphery of each outer race track portion and the mounting hole becomes short, and this distance sometimes can not be kept to be more than 10.5 mm. For this reason, the hardness in the portion where the foregoing mounting hole is to be formed becomes high too, so that working of this mounting hole will be cumbersome. Although working of this mounting hole may be well performed before the formation of the hardened layer in each outer race track portion, when the hardening treatment is performed after the working of the mounting hole, the considerations for preventing the occurrence of defects due to stress concentration in the mounting hole portion is needed, resulting in troublesomeness of the hardening treatment.

Furthermore, as described in the foregoing Utility Model Gazette No. 2529597, the technology has been known, in which the hardened layer is formed also between a plurality of the tracks of the outer race in order to enhance the durability of the rolling bearing unit with the rotation speed detection instrument including the outer race by making the outer race not liable to occur the plastic deformation, even when an impact load is applied to the outer race through the hub and the rolling element owing to reasons such as crashing of the wheel against the paving stone. As described above, in the case where the hardened layer is formed also between a plurality of the outer race tracks of the outer race, the working of the foregoing mounting hole becomes cumbersome, not only in the case of small-sized rolling bearing units but also even in the case of comparatively large-sized rolling bearing unit with the rotation speed detection instrument in which the distance between the end periphery of each outer race track portion formed in the inner periphery surface of the outer race and the mounting hole, is relatively large.

SUMMARY OF THE INVENTION

From the viewpoint of the above described circumstances, the first object of the present invention is to provide a rolling bearing unit with a rotation speed detection instrument which is capable of performing the working operation particularly for the foregoing mounting hole without making the hardening treatment troublesome.

The rolling bearing unit with a rotation speed detection instrument to achieve the first object comprises a hub rotating together with a wheel at the time of its use, the hub having a plurality of inner race tracks in an outer peripheral surface thereof; an outer race formed of steel material, which at the time of its use, is supported stationary by a suspension device and does not rotates the outer race having a plurality of outer race tracks in an inner peripheral surface to face the inner race tracks; rolling elements, each being rotatably provided between the inner race track and the corresponding outer race track; an encoder fixedly fitted on a portion of the outer peripheral surface of the hub arid between the inner race tracks, the encoder exhibiting a characteristic which changes in its circumference direction alternately at equal intervals; and a sensor having a detecting section, the sensor being supported in a mounting hole provided in an intermediate portion of the outer race in its axial direction to face the encoder and changing its output signal in response to the change of the characteristic of the encoder, wherein a hardened layer is formed in each outer race track portion in the inner peripheral surface of the outer race.

Particularly, the present invention is directed to the rolling bearing unit with the rotation speed detection instrument in which the distance between the mounting hole and an end periphery of the outer race track closest to the mounting hole among the plural outer race tracks is 10.5 mm or less. In this rolling bearing unit with the rotation speed detection instrument, the portion where the mounting hole is formed is not hardened, and a hardened layer formed in the outer race track closest to the mounting hole has a thickness of 1.5 mm or more.

Furthermore, it is perferable that, in the rolling bearing unit with the rotation speed detection instrument, the distance between the mounting hole and the end periphery of the outer race track closest to the mounting hole among the outer race tracks is at a range from 2 to 10.5 mm, and the minimum distance between the mounting hole and the hardened layer, which is formed in each outer race track portion and has a hardness of 500 Hv or more, is 0.5 mm or more.

In this case, a working operation for the mounting hole to mount or support the sensor in the outer race can be easily performed without degrading the durability of each outer race track portion as well as without making a hardening treatment for each outer race track portion troublesome. Specifically, since the mounting hole portion is not subjected to hardening, the working of the mounting hole can be easily performed.

When the distance between the mounting hole and the end periphery of the outer race track close to this mounting hole is set to 2 mm or more, the minimum thickness of 1.5 mm for the hardened layer formed in each outer race track portion, which is necessary for securing the durability of each outer race track, can be secured. Furthermore, by setting the minimum distance between the mounting hole and the hardened layer formed in each outer race track portion to 0.5 mm or more, the mounting hole can be formed in a raw material portion apart from a transition layer or at least in a semi-raw portion exhibiting a low hardness, and even after the hardened layer is formed in each outer race track portion, the working of the mounting hole can be easily performed.

It is perferable that in the rolling bearing unit with the rotation speed detection instrument to achieve the first object, the hardened layers provided in the portions where the outer race tracks are formed are connected by a jointing hardened layer provided at a position apart from the mounting hole in its circumference direction, which has a hardness of 500 Hv or more, and the minimum distance between the jointing hardened layer and the mounting hole is 0.5 mm or more.

According to the rolling bearing unit with the rotation speed detection instrument last described, even when an impact load is applied to the outer race through the hub and the rolling elements, the outer race does not tend to make a plastic deformation, and the working of the mounting hole can be in addition easily performed.

By virtue of the rotation bearing unit with the rotation speed detection instrument to achieve the first object, which is constructed as described above, a wheel is supported rotatably on the suspension device, and an operation to detect the rotation speed of the wheel is conducted similarly to that of the case of the conventional rotation bearing unit with a rotation speed detection instrument, which has been well known.

By the way, in the case of the rolling bearing unit with the rotation speed detection instrument in which the hardened layer is formed also in the position between the plural outer race tracks in the inner periphery surface of the outer race, the working of the mounting hole formed in the outer race to fixedly support the sensor becomes difficult.

Accordingly, the second object of the present invention is to provide a working method of an outer race for use in a rolling bearing unit with a rotation speed detection instrument which makes it possible to work a sensor mounting hole even when a hardened layer is formed not only in the portions where the outer race tracks are formed but also between a plurality of the outer race track portions in an inner peripheal surface of an outer race, an outer race obtained by this method, and a rolling bearing unit with a rotation speed detection instrument obtained by this method.

Furthermore, aiming at securing toughness of the outer race and preventing occurrence of damages such as cracks in the outer race regardless of an impact load which may be applied during running of cars, in order to leave a raw portion which is not hardened by hardening in the vicinity of an outer diameter side of the portion between the outer race tracks in a part of the outer race, a hardened layer must be formed in an inner peripheral surface of the outer race while cooling an outer peripheral surface of the outer race with coolant. A further object of the present invention is to provide a working method which is capable of preventing the occurrence of unevenness of the hardened layer due to an invasion of the coolant into the inner peripheral surface of the outer race.

A rolling bearing unit with a rotation speed detection instrument to achieve the second object of the present invention comprises; a hub rotating together with a wheel at the time of its use, the hub having a plurality of inner race tracks in an outer peripheral surface thereof; an outer race which, at the time of its use, is supported stationary by a suspension device and does not rotates, the outer race having a plurality of outer race tracks in an inner peripheral surface of the outer race to face the inner race tracks; rolling elements, each being rotatably provided between the inner race track and the corresponding outer race track; an encoder fixedly fitted on a portion of the outer peripheral surface of the hub between the inner race tracks, the encoder exhibiting a characteristic which changes in its circumference direction alternately at equal intervals; and a sensor having a detecting section, the sensor being supported in a mounting hole provided in an intermediate portion of the outer race in its axial direction in a state where the detecting section faces the encoder and changing its output signal in response to the change of the characteristic of the encoder, and wherein a hardened layer is formed in the portions where the outer race tracks are formed and in the portion between the outer race tracks, in the inner peripheral surface of the outer race, and the mounting hole is formed using a drill having a superhard drill or a ceramic chip, while cooling and lubricating a cut portion by cutting oil.

Furthermore, in a method for working the outer race constituting the foregoing rolling bearing unit with the rotation speed detection instrument is preferably performed in such manner that the hardened layer in the portions of the outer race where the plural outer race tracks are formed in the inner peripheral surface of the outer race and a portion between both the outer race tracks is formed, and thereafter a mounting hole is formed in the intermediate of the outer race in the axial direction thereof and between the plural outer race track portions, using an ultrahard drill or a drill provided with a ceramic clip, while cooling and lubricating a cut portion by cutting oil.

In a method of working the outer race of the rolling bearing unit with the rotation speed detection instrument, it is preferable that the hardened layer in the inner peripheral surface of the outer race and at the portions where the outer race tracks are formed and at the portion between both the outer race tracks, is formed while cooling said outer race from the outer periperal surface side by coolant, and a cutting speed of the drill for forming a mounting hole is 20 m/min. or less expressed by speed of an outer peripheral surface of the drill.

In the rolling bearing unit with the rotation speed detection instrument to achieve the second object, in a situation where the mounting hole is formed from the outer peripheral surface side of the outer race to a certain portion in a diameter direction of the outer race, the hardened layer can be formed by heating the inner peripheral surface of the outer race while cooling the outer race from its outer peripheral surface side by coolant, and the mounting hole can be completed by perforating through to the inner peripheral surface of the outer race after the hardened layer is formed.

In a method for working an outer race constituting the rolling bearing unit with the rotation speed detection instrument to achieve the second object, it is preferable that after the mounting hole is formed from the outer peripheral surface side of the outer race to a certain portion in a diameter direction of the outer race, the hardened layer is formed by heating the inner peripheral surface of the outer race while cooling the outer race from its outer peripheral surface side by coolant, and the mounting hole is completed by perforating through to the inner peripheral surface of the outer race after the hardened layer is formed.

In the rolling bearing unit with the rotation speed detection instrument to achieve the second object, after the mounting hole is formed, the hardened layer may be formed by heating the inner peripheral surface of the outer race while cooling the outer peripheral surface of the outer race by coolant in a state where the mounting hole is hermetically sealed or substantially sealed by a plug.

In a method for working the outer race constituting the rolling bearing unit with the rotation speed detection instrument to achieve the second object, after the mounting hole is formed at a portion between the outer race tracks, in an intermediate portion of the outer race in its axial direction, the hardened layer may be formed by heating the inner peripheral surface of the outer race while cooling the outer peripheral surface of the outer race by coolant in a state where the mounting hole is hermetically sealed or substantially sealed by a plug.

In the rolling bearing unit with a rotation speed detection instrument to achieve the second object, after the mounting hole is formed, the hardened layer may be formed by, while rotating the outer race, heating the inner peripheral surface of the outer race and cooling the outer peripheral surface of the outer race by coolant blown upward.

In a method for working the outer race constituting the rolling bearing unit with the rotation speed detection instrument to achieve the second object, after the mounting hole is formed in an intermediate portion of the outer race in its axial direction and at a portion between the outer race tracks, the hardened layer may be formed by, while rotating the outer race, heating the inner peripheral surface of the outer race and cooling the outer peripheral surface of the outer race by coolant blown upward.

In the rolling bearing unit with the rotation speed detection instrument to achieve the second object, after the mounting hole is formed, the hardened layer may be formed by heating the inner peripheral surface of the outer race while cooling the outer peripheral surface of the outer race by gaseous coolant.

In a method for working the outer race constituting the rolling bearing unit with the rotation speed detection instrument, after the mounting hole is formed in an intermediate portion of the outer race in its axial direction and at a portion between the outer race tracks, the hardened layer may be formed by heating the inner peripheral surface of the outer race while cooling the outer peripheral surface of the outer race by gaseous coolant.

According to the bearing unit with the rotation speed detection instrument and the method for working the outer race for use in the bearing unit with the rotation speed detection instrument to achieve the second object, the mounting hole for fixedly supporting the sensor may be formed even in the outer race provided with the hardened layer for preventing deformation. Therefore, a bearing unit with a rotation speed detection instrument which comprises an outer race which is not apt to deform due to a impact and fixedly supports a sensor in the mounting hole formed in the intermediate portion of the outer race in its axial direction can be realized.

By the bearing unit with the rotation speed detection instrument to achieve the second object, which comprises the outer race formed as described above, a wheel is rotatably supported on the suspension device, and an operation when the rotation speed of the wheel is detected is the same as that of the well known conventional bearing unit with the rotation speed detection instrument.

BRIEF DESCRIPTION OF THE DRAWINGS

For a more complete understanding of the present invention and the advantages thereof, reference is now made to the following description taken in conjunction with the accompanying drawings, in which.

DESCRIPTION OF THE PREFERRED EMBODIMENTS

Figure 1:
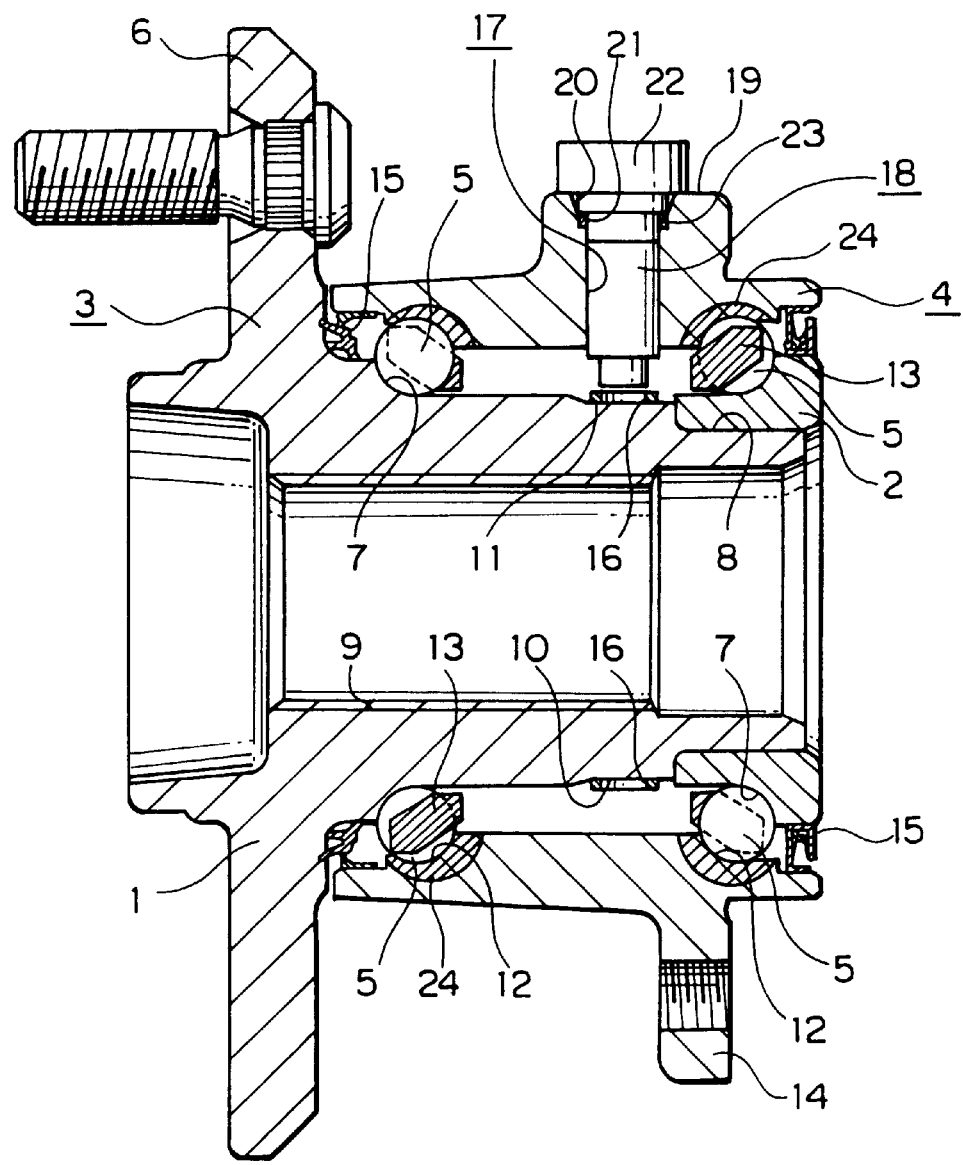
FIG. 1 is a sectional view showing a first embodiment of the present invention.
Figure 2:
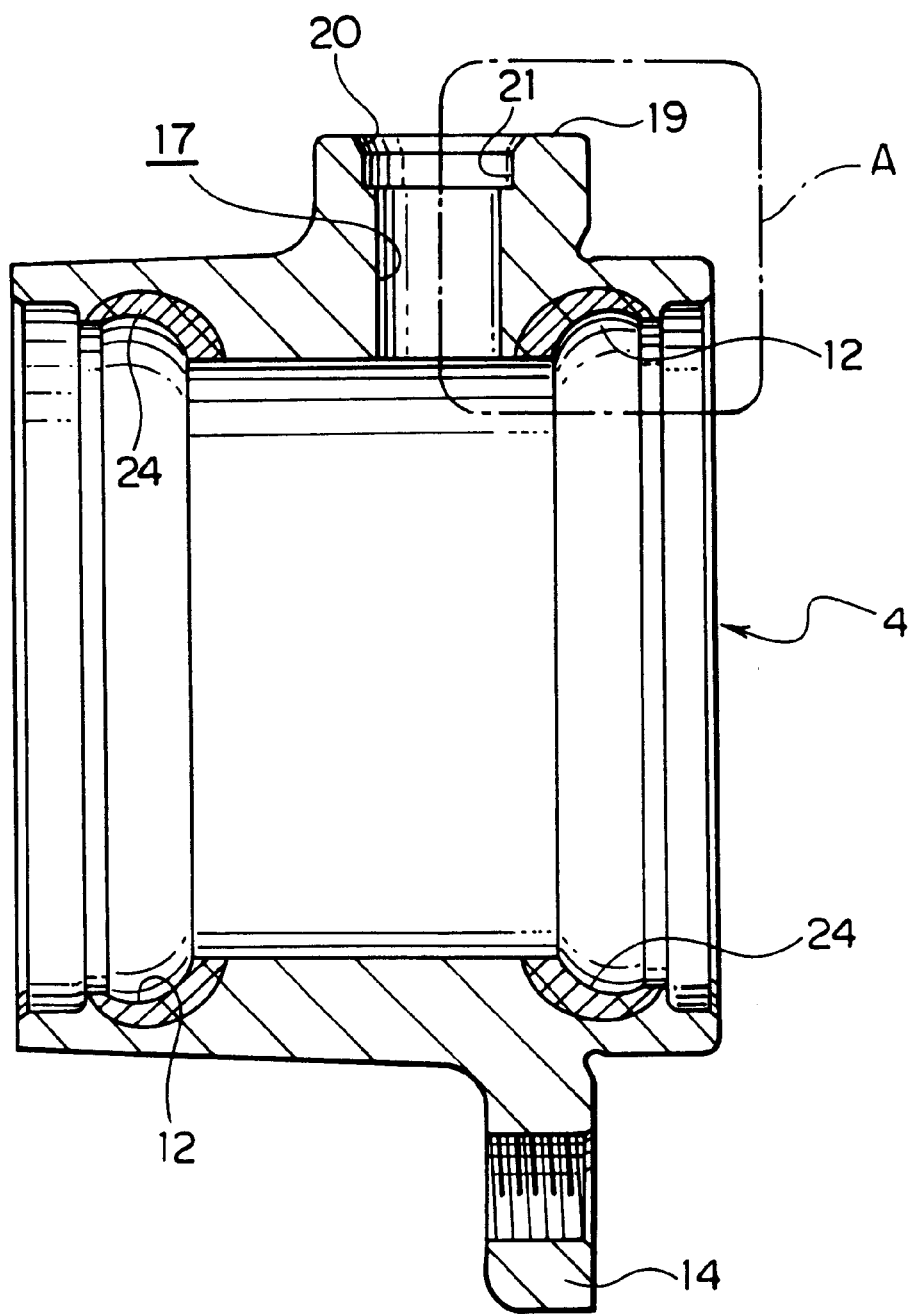
FIG. 2 is a sectional view of an outer race extracted from the sectional view of FIG. 1.
Figure 3:
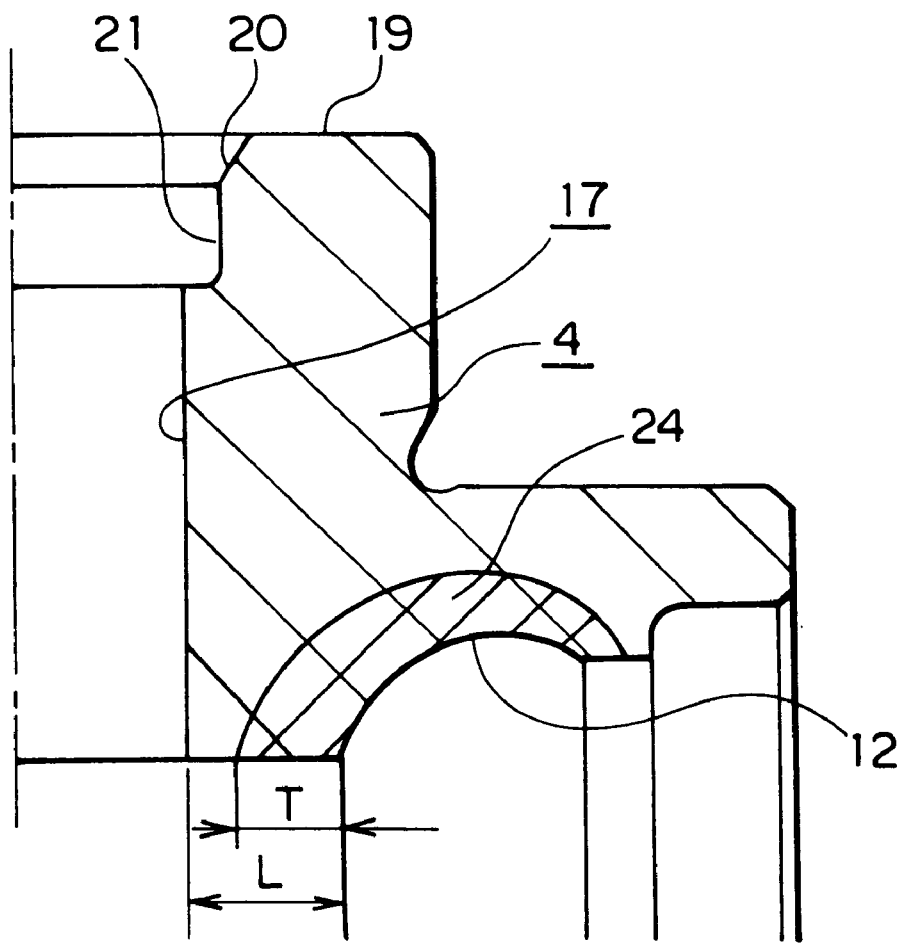
FIG. 3 is an enlarged sectional view of the portion A of FIG. 2.

FIGS. 1, 2 and 3 show a first embodiment of the present invention. A rolling bearing unit with a rotation speed detection instrument of this embodiment comprises a hub 3 composed of a hub body 1 and an inner race 2; an outer race 4; and a plurality of rolling elements 5 and 5. A flange 6 for supporting a wheel is provided in an external side end portion of an outer peripheral surface of the hub body 1. Hereupon, the word "external" means the outside in the width direction of a car when the rolling bearing unit is assembled to the car and the left side of FIGS. 1 and 2. On the contrary, the word "internal" means the inside of the car in its width direction and the right direction of FIGS. 1 and 2. Furthermore, an inner race track 7 is formed on the intermediate portion of the outer peripheral surface of the hub body 1. Besides the formation of the inner race track 7 directly on the intermediate of the outer peripheral surface of the hub body 1, the inner race track 7 is sometimes formed on an outer peripheral surface of another inner race which is fitted on the intermediate of the outer peripheral surface of the hub body 1.

In an internal end portion of the outer peripheral surface of the hub body 1, provided is a step portion 8 concentrically with the hub body 1, which formed by cutting the whole of the internal side end portion of the outer peripheral surface of the hub body 1 into its diameter direction. The inner race 2 formed with another inner race track 7 in its outer peripheral surface is interference-fitted on and fixed to the step portion 8. An internal end portion of the inner race 2 protrudes from the internal side end portion of the hub body 1 inward in a state where the inner race 2 is fitted on and fixed to the step portion 8. The internal side end portion of the inner race 8 is in contact with the stepped surface of a constant velocity joint (not shown) in a state where the rolling bearing unit is assembled in the car. Furthermore, also in a state where it is assembled in the car, a spline shaft annexed to the constant velocity joint is made to pass through a spline hole 9 provided in the central portion of the hub body 1. A nut (not shown) is screw-fitted on a male screw portion which is provided at a tip end portion of the spline shaft which protrudes from the external side portion of the hub body 1, and is tightened. Upon this tightening of the nut, the step difference surface of the constant velocity joint strongly presses the internal side end surface of the inner race 2, resulting in preventing the inner race 2 from detaching from the step portion 8. Furthermore, a fitting portion 10 having a diameter slightly smaller than that of the intermediate of the hub body 1 is provided in an end portion of the intermediate of the hub body close to the step portion 8. The diameter of the intermediate of the hub body 1 is larger than that of the step portion 8. The outer diameter of the fitting portion 10 is made slightly larger than the inner diameter of a later described encoder 11 at the time when the encoder 11 is in a free state, so that the encoder 11 is interference-fitted on and fixed to the fitting portion 10. The outer diameter of the encoder 11 in the state where the encoder is fitted on the mounting portion 10, is made smaller than that of a part of the intermediate of the hub body 1, which part is positioned closer to the external side end portion than the fitting portion 10.

In the inner peripheral surface of the outer race 4, a plurality of outer race tracks 12 and 12 are formed, which face the corresponding inner race tracks 7 and 7, respectively. A plurality of rolling elements 5 and 5 are provided between the inner races 7, 7 and the outer race track 12, 12 with held by the retainers 13, 13, whereby the hub 3 is rotatably supported in the inside of the outer race 4. In the illustrated embodiment, though balls are used as the rolling elements 5 and 5, tapered rollers can be used as the rolling elements, in the case of the rolling bearing unit for use in cars which are heavy in weight. Moreover, in the outer peripheral surface of the outer race closer to the internal end portion, provided is an attaching portion 14 for attaching the outer race 4 to the suspension device, which looks like a flange tending outward. Gaps between opening portions of the both ends of the outer race 4 and the intermediate of the outer peripheral surface, and the inner end portion of the outer peripheral surface of the inner race 2 are closed by the sealing rings 15 and 15, respectively.

The encoder 11 is fitted on and fixed to the fitting portion 10 at the intermediate of the outer peripheral surface of the hub body 1, concentrically with the hub body 1. The encoder 11 is formed of a magnetic metal plate such as a steel plate, and is formed to be cylindrical in its entirety. The encoder 11 is interference-fitted on and fixed to the fitting portion 10. The encoder 11 is arranged between the lines of the rolling elements 5 and 5 provided in plural lines. A plurality of through holes 16 and 16 are formed in the intermediate of the encoder 11 in its axial direction at equal intervals in its circumference direction, whereby a magnetic characteristic of the outer peripheral surface of the encoder 11 is changed alternately in its circumference direction and at equal intervals.

On the other hand, a mounting hole 17 is formed through in the intermediate of the outer race 4 in its axis direction and in the outside position of the encoder 11 in its diameter direction, in a state where the inner peripheral surface of the outer race 4 and the outer peripheral surface of the outer race 4 are communicated to each other. Then, a sensor 18 including a detection device embedded in synthesis resin is inserted and fixed in the mounting hole 17, so that the detection portion provided in the tip end surface of the sensor 18 (drawn in the lowermost surface of FIG. 1) is allowed to face the outer peripheral surface of the encoder 11 with a small gap. In a state where the sensor 18 is inserted and fixed in the mounting hole 17, the sensor 18 can detect the rotation speed of the encoder 11.

Furthermore, a flat attaching plane 19 is formed around the opening of the outer end of the mounting hole 17 and at the outer peripheral surface of the outer race 4, which plane exists in a direction perpendicular to the central axis of the mounting hole 17. A conical concave chamfered portion 20 and a cylindrical receiving plane 21 are formed in the connection portion between the attaching plane 19 and the inner peripheral surface of the mounting hole 17, in this order. On the other hand, an attaching portion 22 is fixedly provided in the base end portion of the sensor 18 (drawn in the uppermost end portion of FIG. 1), and the attaching portion 22 is connected to the outer race 4 to fix to each other, by a screw (not shown) which is made to pass through the end portion of the attaching portion 22. In this situation, an O-ring 23 fitted on the base end portion of the sensor 18 is elastically compressed between the outer peripheral surface of its base end portion and the inner peripheral surface of the receiving plane 21, whereby the portion attaching the sensor 18 is sealed and it is prevented that an extraneous material such as rain invades inside of the inner race 4 through the mounting hole 17.

Furthermore, hardened layers 24 and 24 having a hardness of 500 Hv or more are formed in the inner peripheral surface of the outer race 4, and in the portions where the respective outer race tracks 12 and 12 are formed. The hardened layers 24 and 24 serve to secure a rolling fatigue life time of the portions of the outer race where outer race tracks 12, 12 are formed, regardless of loads repeatedly applied from the rolling surfaces of the rolling elements 5 and 5 to the tracks, and have a thickness of 1.5 mm or more, as described. Particularly, the rolling bearing unit with the rotation speed detection instrument of this embodiment is applied to the one in which the distance L (see FIG. 3) between the mounting hole 17 and the end periphery of the outer race track 12 which is positioned closer to the mounting hole 17, of the outer race tracks 12 and 12 that is, which is located on the right side of FIGS. 1 and 2, ranges from 2 to 10.5 mm. In addition, in the case of this embodiment, in order to keep the minimum distance between the mounting hole 17 and the hardened layer 24, 24 formed in each of the portions where the outer race tracks 12, 12 are formed at 0.5 mm or more, the thickness T of each of the hardened layers 24 and 24 (see FIG. 3) is regulated so that the portion constituting the mounting hole 17 is left to be raw steel material which is not hardened or semi-raw steel material which is soft.

In the case where the distance L is less than 2 mm, it is impossible to secure the rolling fatigue life time of the outer race tracks 12 and 12 and to make the working of the mounting hole 17 easy. Furthermore, in the case where the distance L exceeds 10.5 mm, the working of the mounting hole 17 can be easily performed without regulating the thickness T of the hardened layers 24 and 24. In other words, in a comparatively large-sized bearing unit with a rotation speed detection instrument in which the distance L exceeds 10.5 mm, the working of the mounting hole 17 can be easily performed. However, in the case of a rolling bearing unit in which the distance L is 10.5 mm or less, if the regulation of the thickness T of the hardened layers 24 and 24 is not performed, the working of the mounting hole 17 becomes troublesome. Specifically, this embodiment is applied to a comparatively small-sized rolling bearing unit with a rotation speed detection instrument in which the distance L does not exceed 10.5 mm.

In the case of the rotation bearing unit with a rotation speed detection instrument of this embodiment, the wheel fixed to the flange 6 which is provided in the external side end portion of the hub body 1 can be rotatably supported on the suspension device supporting the outer race 4. Furthermore, when the encoder 11 fixedly fitted on the inner race 2 rotates with the rotation of the wheel, the through holes 16 and 16 formed in the intermediate of the encoder 11 in its axial direction and the pole portions each existing between the through holes 16 and 16 which are adjacent to each other in the circumference direction, alternately pass through near the detection portion provided in the tip end surface of the sensor 18. As a result, a density of magnetic flux flowing through the sensor 18 changes, and an output of the sensor changes. The frequency in which the output of the sensor 18 changes is proportional to the rotation speed of the wheel. Therefore, if the output of the sensor is sent to a controller (not shown), the ABS and the TCS can be suitably controlled.

Particularly, in the case of the rolling bearing unit with a rotation speed detection instrument of this embodiment, the working of the mounting hole 17 for supporting the sensor 18 on the outer race 4 can be easily performed without making the hardening treatment for the hardened layers 24 and 24 troublesome, which layers are formed at the portions of the outer race where the tracks 12 and 12 are formed. Specifically, since the distance L between the mounting hole 17 and the end periphery of the outer race track 12, which is located on the right side of FIGS. 1 and 2 and closest to the mounting hole 17 among the outer race tracks 12 and 12, is set to be 2 mm or more, the minimum thickness (1.5 mm) of the hardened layer 24, which is required for securing the durability of the outer race track 12, can be secured. As a matter of course, the minimum thickness (1.5 mm) of the hardened layer 24, which is required for securing the durability of the outer race 12, can be secured for the outer race track 12 which is farther from the mounting hole 17, that is, on the left side of FIGS. 1 and 2. The minimum distance between the mounting hole 17 and the hardened layers 24 and 24 formed at the portions of the outer race where the tracks 12 and 12 are formed, is set to 0.5 mm or more, so that the mounting hole 17 can be formed at a portion which is apart from the transition layer, and is raw and soft, and the working of the mounting hole 17 can be easily performed even after the formation of the hardened layers 24 and 24 in the portions of the outer race where the tracks 12 and 12 are formed. It should be noted that the control of the thickness of the hardened layers 24 and 24 can be comparatively easily performed by regulating the amount of the power supply to the hardening coil and the power supply time thereto.

Figure 4:
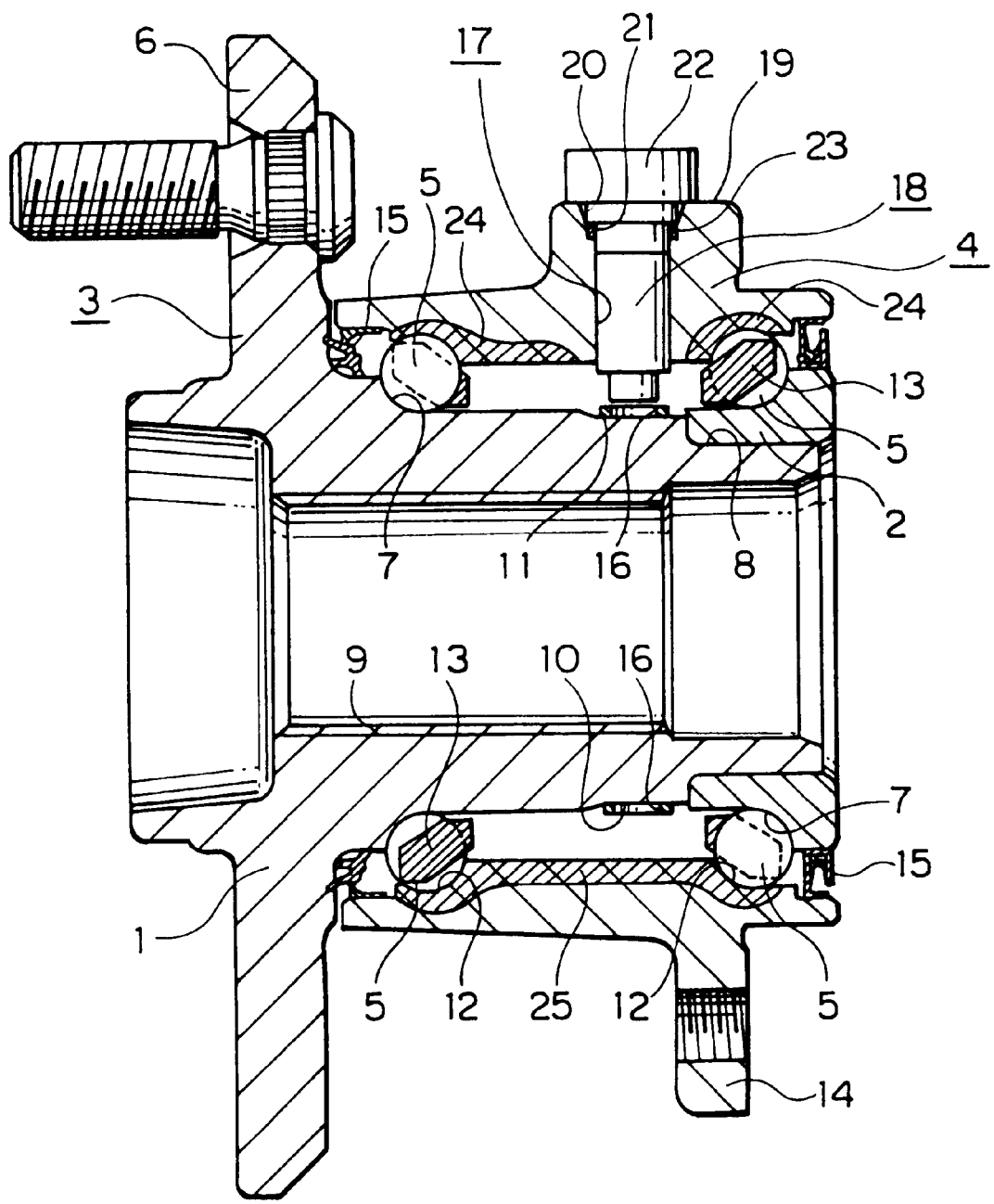
FIG. 4 is a sectional view showing a second embodiment of the present invention.
Figure 5:
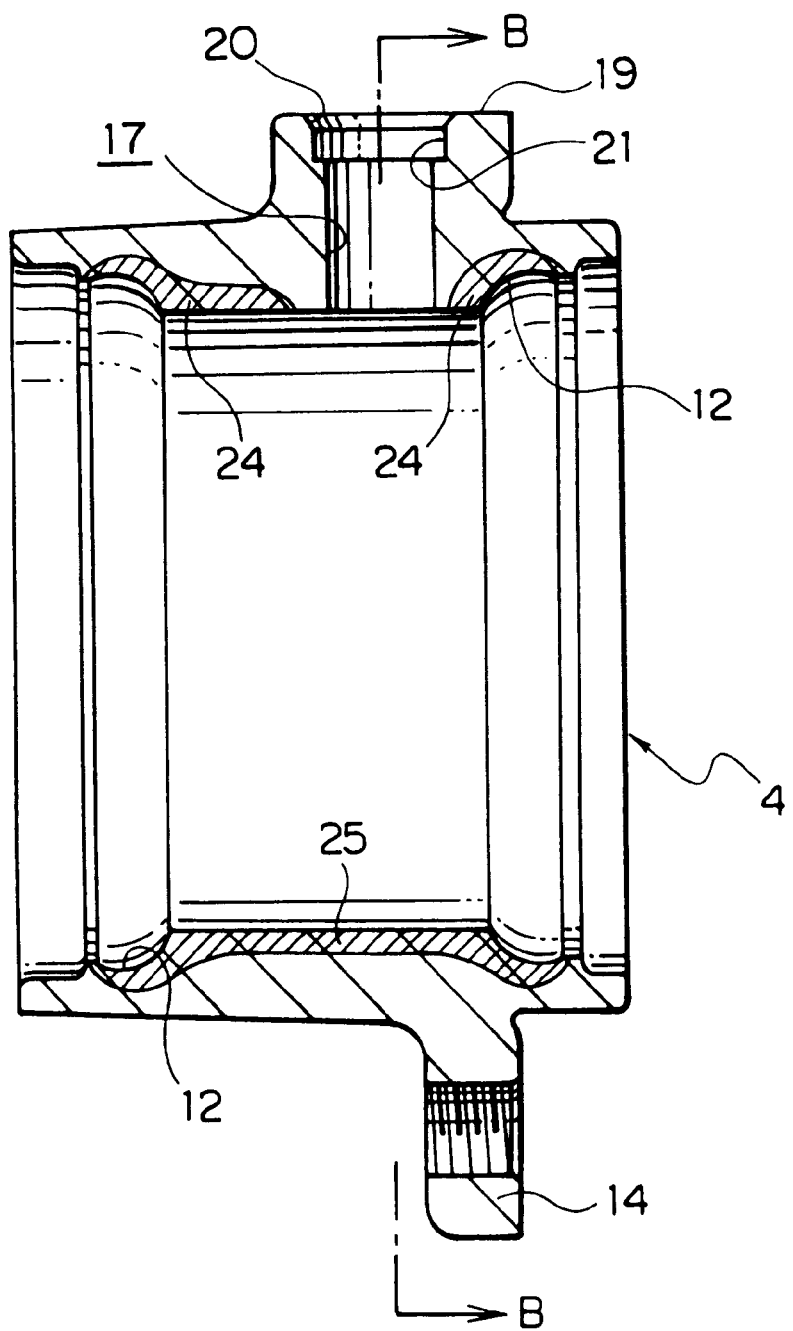
FIG. 5 is a sectional view showing of an outer race extracted from the sectional view of FIG. 4.
Figure 6:
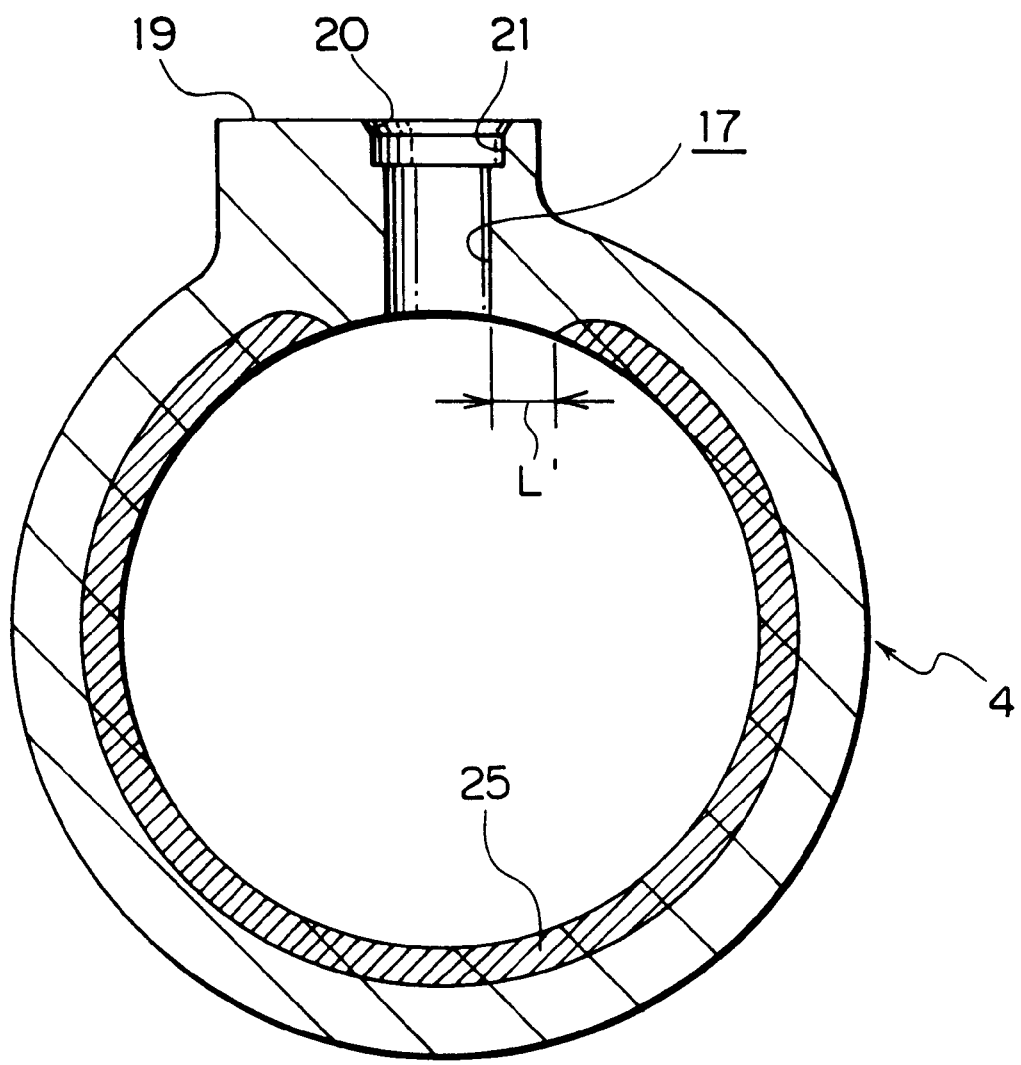
FIG. 6 is a sectional view taken along the line B—B of FIG. 5.
Figure 7:
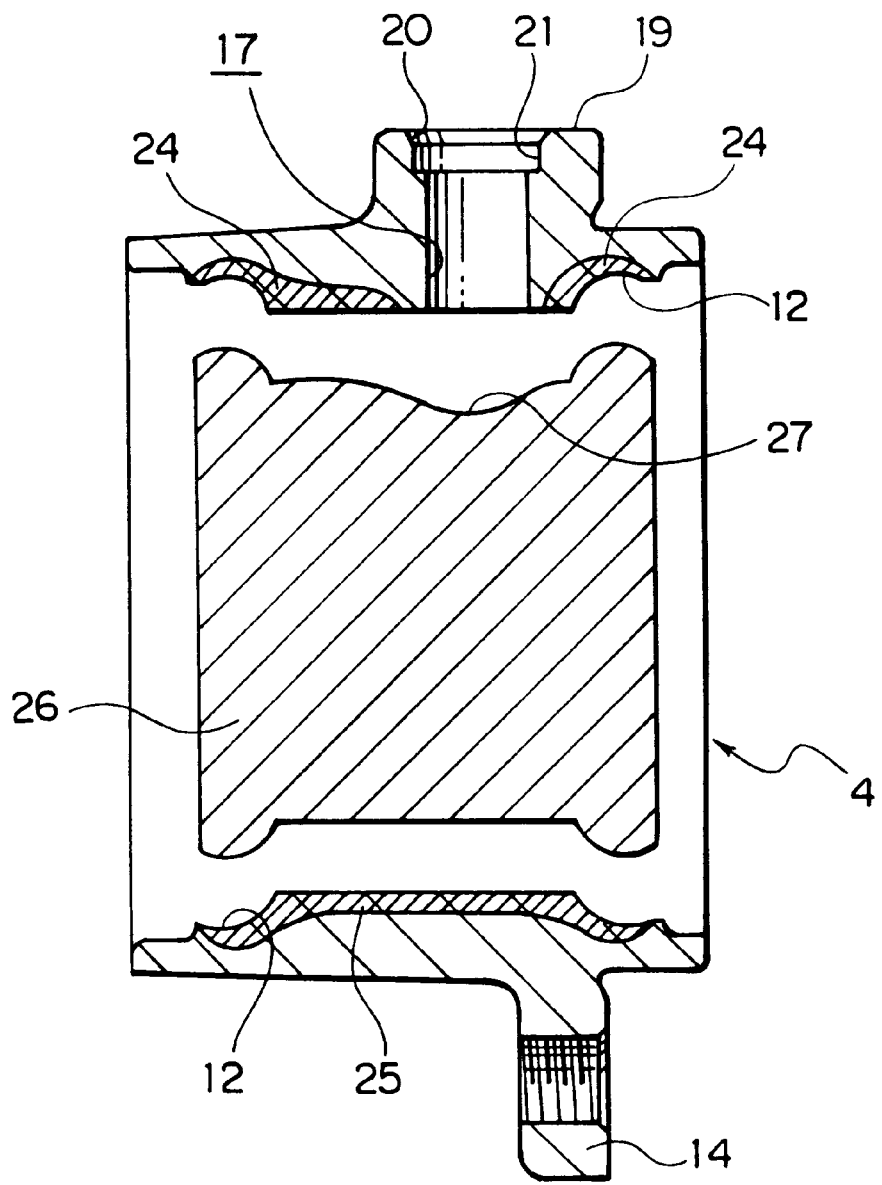
FIG. 7 is a sectional view showing a state in which a hardening coil is provided on the inner side of the outer race.

Next, FIGS. 4, 5 and 6 show a second embodiment of a rolling bearing unit with a rotation speed detection instrument of the present invention. In the case of this embodiment, the hardened layers 24 and 24 respectively provided in the inner peripheral surface of the outer race 4 and in the portions of the outer race where the tracks 12 and 12 are formed, are connected by the jointing hardened layer 25 provided at a position apart from the mounting hole 17 in a circumference direction of the outer race 4. In other words, the outer race tracks 12 and 12 in the inner peripheral surface of the outer race 4 and the portion between the outer race tracks 12 and 12 except the peripheral portion of the mounting hole 17 are made to be harder than the hardness of 500 Hv by the hardened layers 24 and 24 and the jointing hardened layer 25. In the case of this embodiment, the minimum distance between each hardened layer 24, 24 and the mounting hole 17 is not only set to 0.5 mm or more, the minimum distance L' (see FIG. 6) between the jointing hardened layer 25 and the mounting hole 17 is but also set to 0.5 mm or more. Thus, the portion of the mounting hole 17 is made to be raw steel material which is not hardened or to be semi-raw steel material which is soft.

In the case of this embodiment constructed as described above, the portion which is a part of the outer race 4 and between the outer race tracks 12 and 12, becomes less apt to deform plastically. For this reason, even when upon crashing of the wheel against the paving stone an impact load is applied to the outer race 4 through the hub 3 and the rolling elements 5 and 5, the outer race 4 is less apt to deform plastically, so that the durability of the rolling bearing unit with a rotation speed detection instrument including the wheel 4 can be enhanced. Also in the case of this embodiment, the raw steel material portion which is not hardened is left around the jointing hardened layer 25 and the toughness of the outer race 4 is secured, so that occurrence of the damages such as cracks in the outer race 4, due to the foregoing impact load, is prevented.

It should be noted that in order to form the hardened layers 24 and 24 and the jointing hardened layer 25 as described in this embodiment, the hardening coil 26 in which its portion facing the opening portion of the mounting hole 17 on its inner diameter side is concaved inward in its diameter direction is used. Specifically, the outer peripheral surface of the hardening coil 26 has a shape almost according the inner peripheral surface shape of the outer race 4, and a concave portion 27 is formed at its portion facing the opening portion of the mounting hole 17 on its inner diameter side. In the situation where such hardening coil 16 is disposed inside the outer race 4 concentrically with the outer race 4, when an electric current is blown through the coil 26, the plural outer race tracks 12 and 12 and the portion between the outer race tracks 12 and 12 are heated except the peripheral portion of the mounting hole 17, and this heated portion can be treated by hardening. It should be note that when only the predetermined portion in the inner peripheral surface of the outer race 4 is hardened using the hardening coil 26 as described above, in order to strictly define the boundary between the portion which is to be hardened and the portion which is not to be hardened, it is conceived to shorten the distance between the outer peripheral surface of the hardening coil 26 and the inner peripheral surface of the outer race 4. In such case, when the outer diameters of the convex portions existing in both end portions of the hardening coil 26 in its axis direction becomes larger than the inner diameter of the minimum diameter portion existing in the intermediate of the outer race 4 in its axis direction, the hardening coil 26 is constructed so that it can be split into two pieces in its axis direction. It should be noted that in the case of this embodiment, although the distance between the mounting hole 17 and the end periphery of the outer race track 12 closer to the mounting hole 17 needs not to be 10.5 mm or less, it may be at a range from 2 to 10.5 mm as a matter of course. The constitution and operation of the rolling bearing unit of this embodiment are the same as those of the first embodiment.

As another method to achieve the structure of the second embodiment of the present invention shown in FIGS. 4, 5 and 6, the hardened layers 24 and 24 located in the portions of the outer race where the outer race tracks 12 and 12 are formed and the jointing hardened layer 25 can be also formed sequentially. For example, it is conceived that after the jointing hardened layer 25 is formed in the state the outer race 4 is at a standstill, the hardened layers 24 and 24 are formed while rotating the outer race 4, and then the hardened layers 24 and 24 and the jointing hardened layer 25 are connected. Alternatively, it is also possible that after the hardened layers 24 and 24 are formed, the jointing hardened layer 25 is formed to connect the hardened layers 24 and 24.

Figure 8:
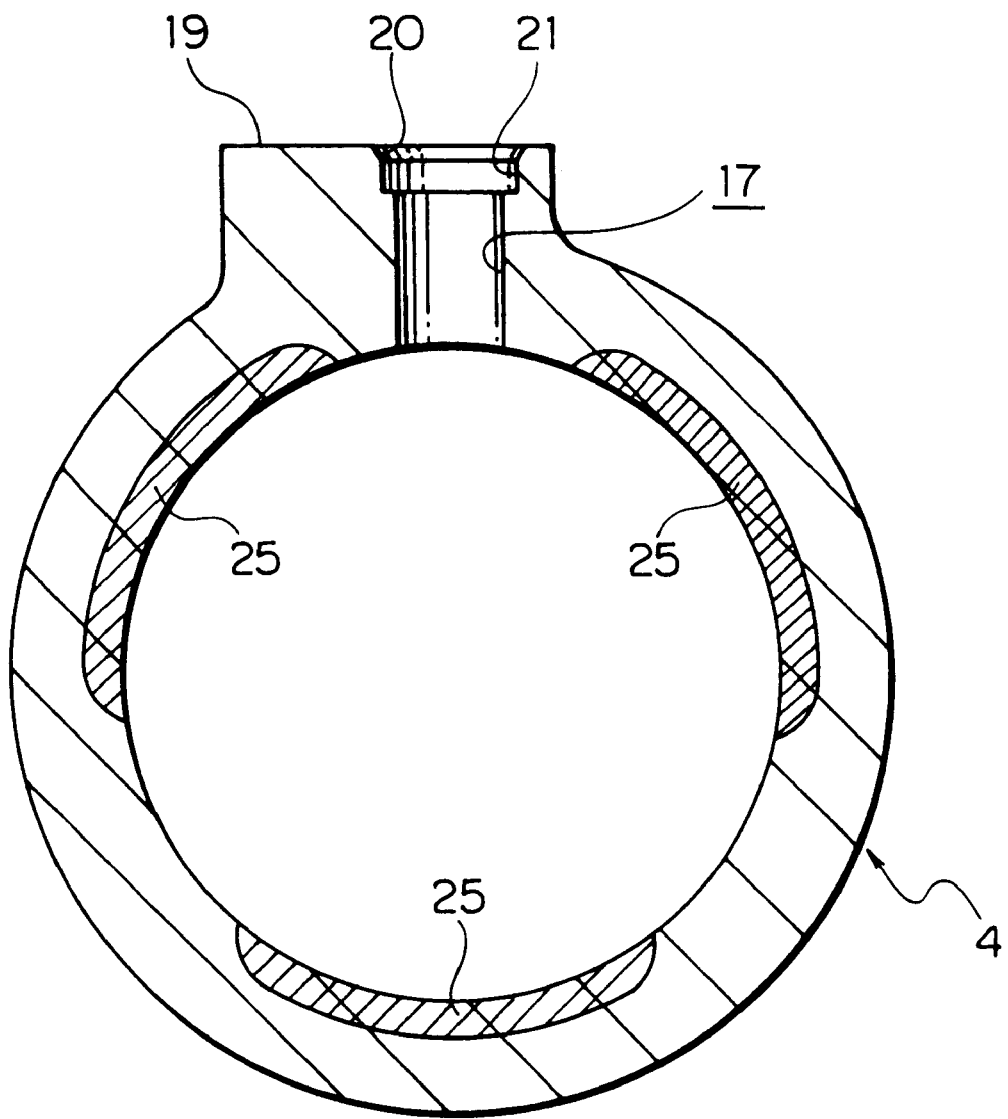
FIG. 8 is a sectional view showing a third embodiment of the present invention, which is drawn similarly to FIG. 6.

FIG. 8 shows an outer race of a third embodiment of the present invention. Since the structure of an inner race of the third embodiment is the same as that of the second embodiment, an illustration and description for it are omitted. In the second embodiment, the jointing hardened layer 25 for connecting the hardened layers 24 and 24 with each other, provided at the portions where the outer race tracks 12 and 12 are formed, is provided almost in its all circumference except for the portion of the mounting hole 17. In the case of this third embodiment, the jointing hardened layers 25 are intermittently formed at three portions in the circumference direction. The mounting hole 17 is disposed between the jointing hardened layers 25 and 25 adjacent to each other in the circumference direction. A structure, operation and manufacturing method of the rolling bearing unit of the present embodiment are the same as those of the first embodiment.

Figure 9:
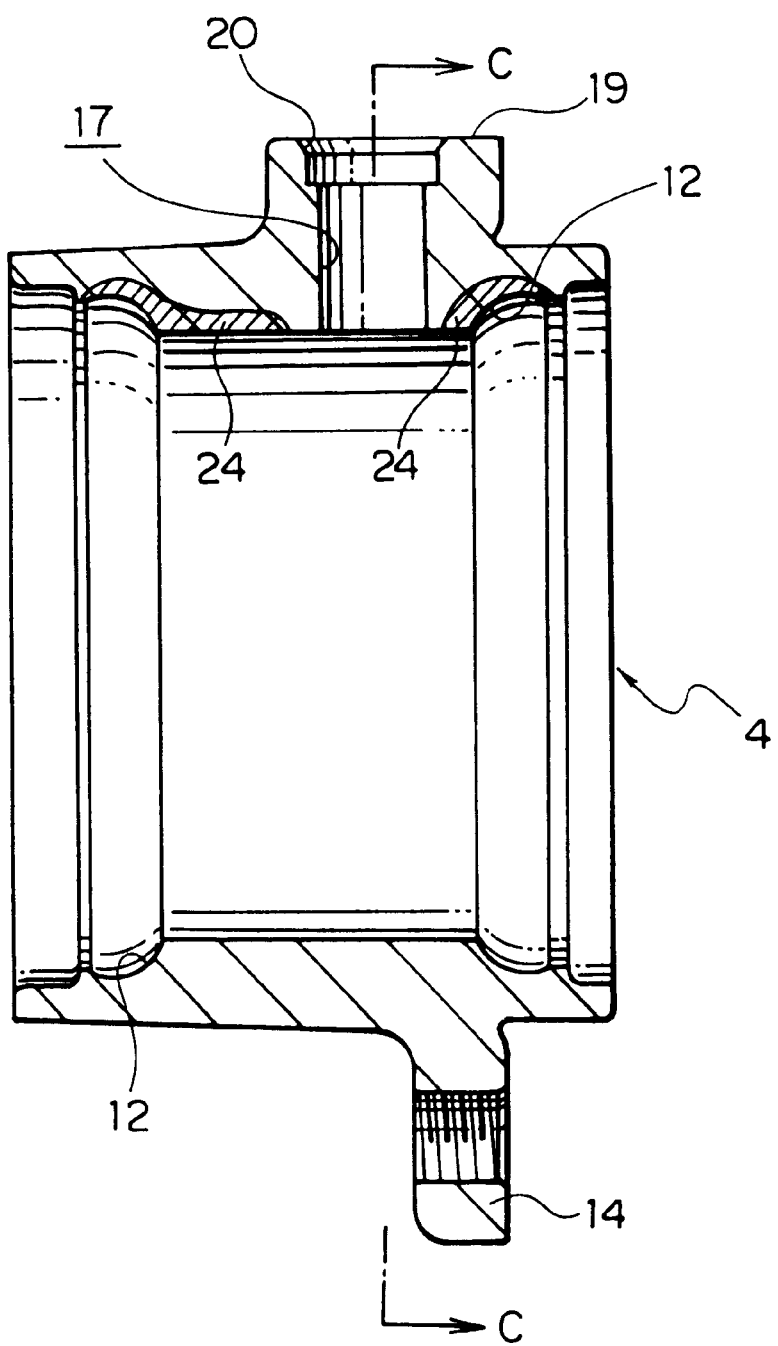
FIG. 9 is a sectional view of an outer race, which shows a fourth embodiment of the present invention.
Figure 10:
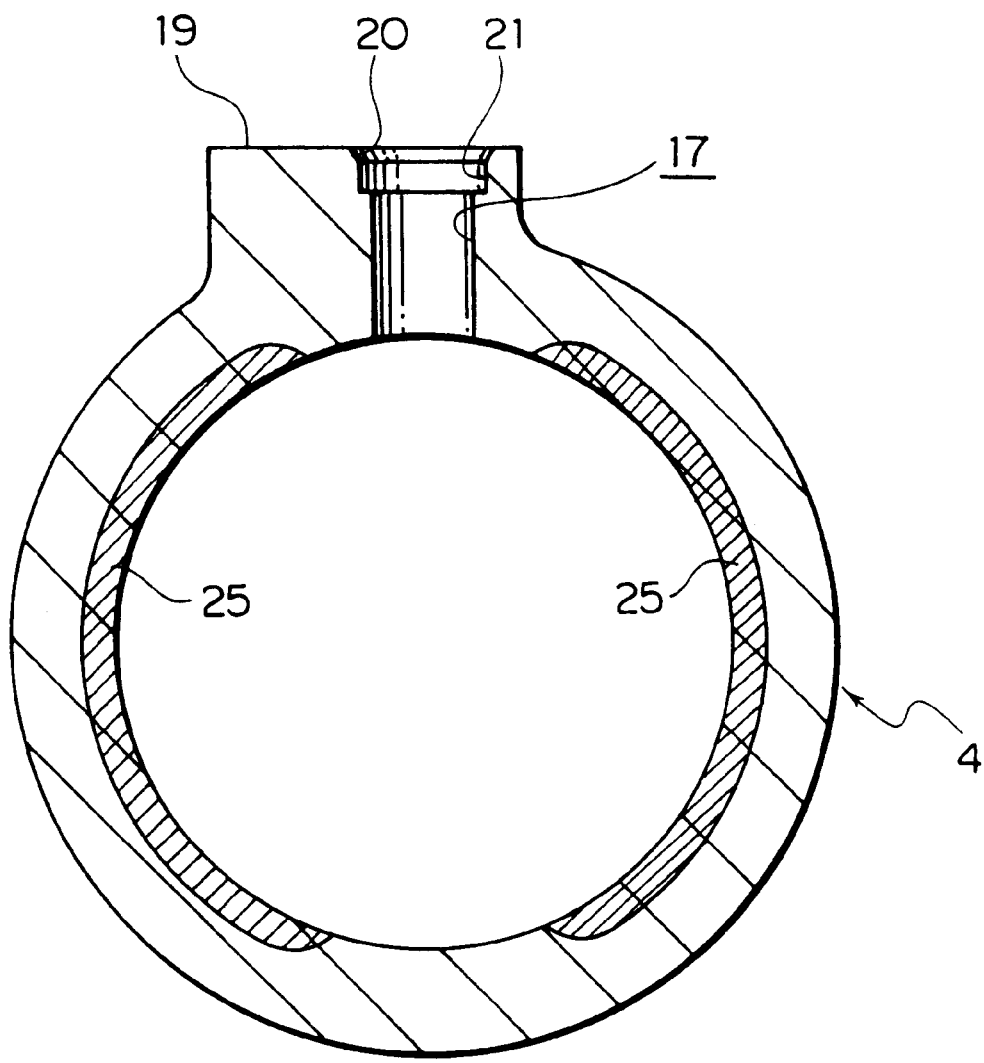
FIG. 10 is a sectional view taken along the line C—C of FIG. 9.

FIGS. 9 and 10 show an outer race of a fourth embodiment of the present invention. Since the structure of an inner race of the third embodiment is the same as that of the first or second embodiment, an illustration and description for it are omitted. In the case of this fourth embodiment, the jointing hardened layers 25 are intermittently formed at two portions in the circumference direction of the inner peripheral surface of the outer race 4. The mounting hole 17 is disposed between the jointing hardened layers 25 and 25 adjacent to each other in the circumference direction. A structure, operation and manufacturing method of the rolling bearing unit of the present fourth embodiment are the same as those of the first embodiment.

Since the rolling bearing unit of the foregoing embodiment of the present invention is constituted as described above and operates, a decrease in cost of the rolling bearing unit with a rotation speed detection instrument can be achieved by making the working operation of the bearing unit easy. Furthermore, according to demand, the foregoing embodiment can also cope with a reduction in a size and a weight of the bearing unit.

Figure 11:
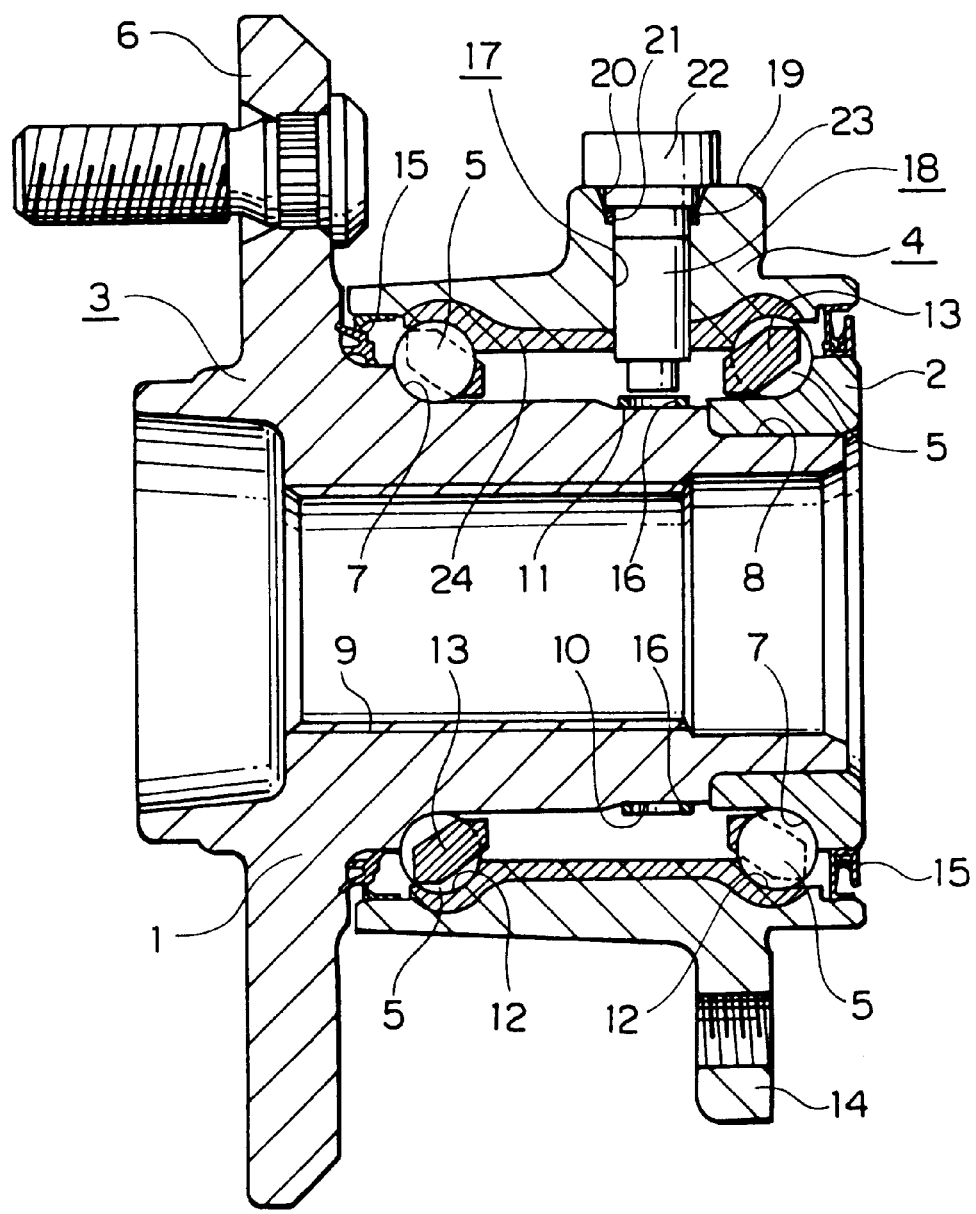
FIG. 11 is a fifth embodiment of the present invention.
Figure 12:
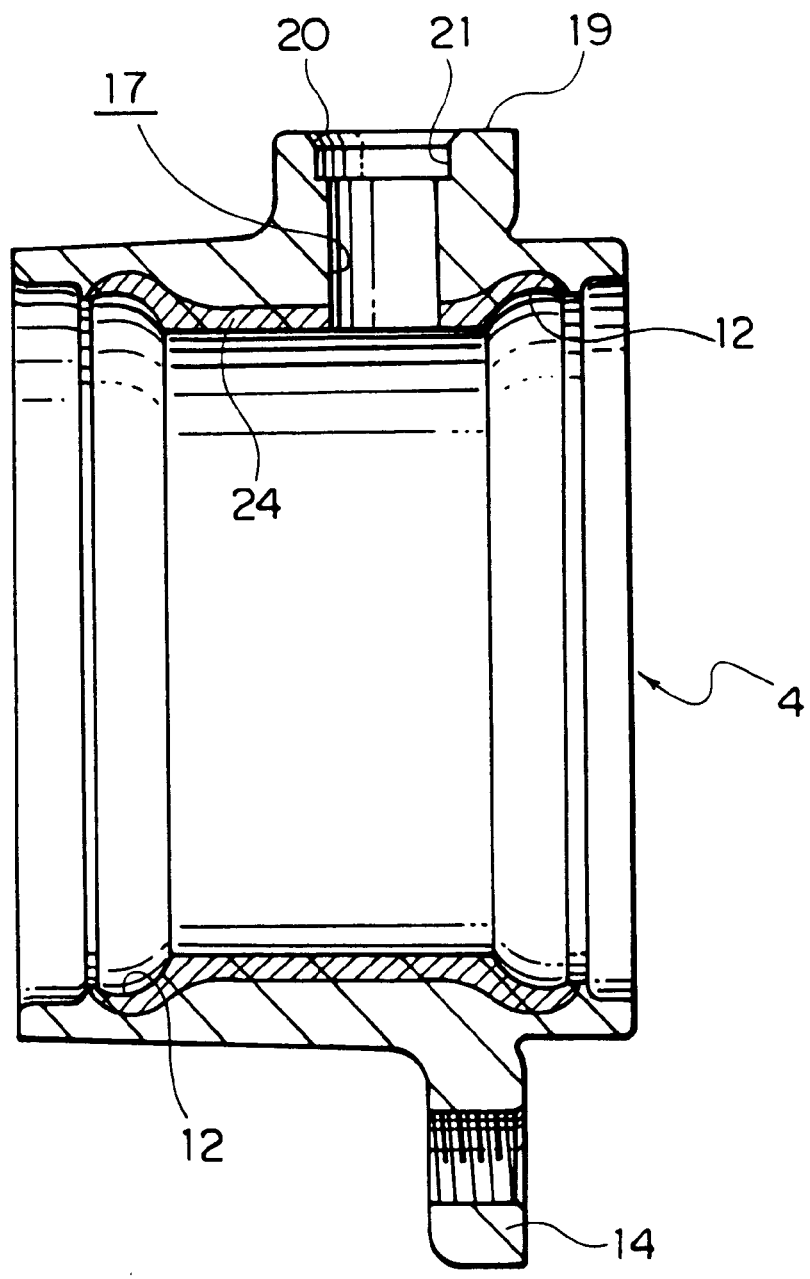
FIG. 12 is a sectional view of an outer race extracted from the sectional view of FIG. 11.

FIGS. 11 and 12 show a fifth embodiment of the present invention. The rolling bearing unit with a rotation speed detection instrument of this fifth embodiment comprises a hub 3 composed of a hub body 1 and an inner race 2; an outer race 4; and a plurality of rolling elements 5 and 5. A flange 6 for supporting a wheel is provided in an external side end portion of an outer peripheral surface of the hub body 1. Hereupon, the word "external" means the outside in the width direction of a car when the rolling bearing unit is assembled to the car and the left side of FIGS. 11 and 12. On the contrary, the word "internal" means the inside of the car in its width direction and the right direction of FIGS. 11 and 12. Furthermore, an inner race track 7 is formed on the intermediate portion of the outer peripheral surface of the hub body 1. Besides the formation of the inner race track 7 directly on the intermediate of the outer peripheral surface of the hub body 1, the inner race track 7 is sometimes formed on an outer peripheral surface of another inner race which is fitted on the intermediate of the outer peripheral surface of the hub body 1.

In an internal side end portion of the outer peripheral surface of the hub body 1, provided is a step portion 8 concentrically with the hub body 1, which formed by cutting the whole of the internal side end portion of the outer peripheral surface of the hub body 1 into its diameter direction. The inner race 2 formed with another inner race track 7 in its outer peripheral surface is interference-fitted on and fixed to the step portion 8. An internal side end portion of the inner race 2 protrudes from the internal side end portion of the hub body 1 inward in a situation where the inner race 2 is fitted on and fixed to the step portion 8. The internal side end portion of the inner race 8 is in contact with the stepped surface of a constant velocity joint (not shown) in a state where the rolling bearing unit is assembled in the car. Furthermore, also in a situation where it is assembled in the car, a spline shaft annexed to the constant velocity joint is made to pass through a spline hole 9 provided in the central portion of the hub body 1. A nut (not shown) is screw-fitted on a male screw portion which is provided at a tip end portion of the spline shaft which protrudes from the external side portion of the hub body 1, and is tightened. Upon this tightening of the nut, the stepped surface of the constant velocity joint strongly presses the internal side end surface of the inner race 2, resulting in preventing the inner race 2 from detaching from the step portion 8. Furthermore, a fitting portion 10 having a diameter slightly smaller than that of the intermediate of the hub body 1 is provided in an end portion of the intermediate of the hub body close to the step portion 8. The diameter of the intermediate of the hub body 1 is larger than that of the step portion 8. The outer diameter of the fitting portion 10 is made slightly larger than the inner diameter of a later described encoder 11 at the time when the encoder 11 is in a free state, so that the encoder 11 is interference-fitted on and fixed to the fitting portion 10. The outer diameter of the encoder 11 is made smaller than that of a part of the intermediate of the hub body 1, which part is positioned closer to the external side end portion than the fitting portion 10.

In the inner peripheral surface of the outer race 4, a plurality of outer race tracks 12 and 12 are formed, which face the corresponding inner race tracks 7 and 7, respectively. A plurality of rolling elements 5 and 5 are provided between the inner races 7, 7 and the outer race track 12, 12 with held by the retainers 13, 13, whereby the hub body 1 and the inner race 2 are is rotatably supported a in the inside of the outer race 4. In the illustrated embodiment, though balls are used as the rolling elements 5 and 5, tapered rollers can be used as the rolling elements, in the case of the rolling bearing unit for use in cars which are heavy in weight. Moreover, in the outer peripheral surface of the outer race closer to the internal side end portion, provided is an outwardly extending flange-like attaching portion 14 for attaching the outer race 4 to the suspension device. Gaps between opening portions of the both ends of the outer race 4 and the intermediate of the outer peripheral surface, and the inner end portion of the outer peripheral surface of the inner race 2 are closed by the sealing rings 15 and 15, respectively.

The encoder 11 is fitted on and fixed to the fitting portion 10 at the intermediate of the outer peripheral surface of the hub body 1, concentrically with the hub body 1. The encoder 11 is formed of a magnetic metal plate such as a steel plate, and is formed to be cylindrical in its entirety. The encoder 11 is interference-fitted on and fixed to the fitting portion 10. The encoder 11 is arranged between the lines of the rolling elements 5 and 5 provided in plural lines. A plurality of through holes 16 and 16 are formed in the intermediate of the encoder 11 in its axial direction at equal intervals in its circumferencial direction, whereby a magnetic characteristic of the outer peripheral surface of the encoder 11 is changed alternately in its circumferencial direction at equal intervals.

On the other hand, a mounting hole 17 is formed through in the intermediate of the outer race 4 in its axial direction and in the outside position of the encoder 11 in its diameter direction, in a state where the inner peripheral surface of the outer race 4 and the outer peripheral surface of the outer race 4 are communicated to each other. Then, a sensor 18 including a detection device embedded in synthesis resin is inserted and fixed in the mounting hole 17, so that the detection portion provided in the tip end surface of the sensor 18 (drawn in the lowermost surface of FIG. 11) is allowed to face the outer peripheral surface of the encoder 11 with a small gap. In a state where the sensor 18 is inserted and fixed in the mounting hole 17, the sensor 18 can detect the rotation speed of the encoder 11.

Furthermore, a flat attaching plane 19 is formed around the opening of the outer end of the mounting hole 17 and at the outer peripheral surface of the outer race 4, which plane exists in a direction perpendicular to the central axis of the mounting hole 17. A conical concave chamfered portion 20 and a cylindrical receiving plane 21 are formed in the connection portion between the attaching plane 19 and the inner peripheral surface of the mounting hole 17, in this order. On the other hand, an attaching portion 22 is fixedly provided in the base end portion of the sensor 18 (drawn in the uppermost end portion of FIG. 1), and the attaching portion 22 is connected to the outer race 4 to fix to each other, by a screw (not shown) which is made to pass through the end portion of the attaching portion 22. In this situation, an O-ring 23 fitted on the base end portion of the sensor 18 is elastically compressed between the outer peripheral surface of its base end portion and the inner peripheral surface of the receiving plane 21, whereby the portion attaching the sensor 18 is sealed and it is prevented that an extraneous material such as rain invades inside of the inner race 4 through the mounting hole 17.

Moreover, the hardened layer 24 exhibiting a hardness of, for example, 500 Hv or more is formed in the portions of the outer race 4 where the outer race tracks 12, 12 are formed and the portion between the outer race tracks 12 and 12 on the inner peripheral surface of the outer race 4. The portions of the hardened layer 24 existing on the outer race tracks 12 and 12 secure the rolling fatigue life time of the outer race tracks 12 and 12 regardless of loads repeatedly applied thereto from the rolling surfaces of the rolling elements 5 and 5. Contrary to this, by making the intermediate of the hardened layer 24 located between the outer race tracks 12 and 12 less apt to deform plastically, it can be prevented that the portion of the outer race 4 located between the outer race tracks 12 and 12 deforms plastically, regardless of an impact load applied from the rolling elements 5 and 5 due to running of the wheel on the paving stone.

The hardened layer 24 is formed by heating the outer race 4 from its inner peripheral surface side while cooling the outer peripheral surface of the outer race 4 with coolant such as cooling water and cooling oil. It should be noted that a hardened layer of sixth embodiment described later is formed in the same manner as this embodiment. The reason why the hardened layer 24 is formed while cooling the outer peripheral surface of the outer race 4 is that by preventing a production of an extremely large outer diameter of the hardened layer 24 and preventing a production of an hardened outer peripheral surface of the outer race 4, toughness of the outer race 4 is secured, and an occurrence of damages such as cracks of the outer ring 4 is prevented regardless of an impact load which may be applied during running of cars. In addition, by making small the thickness of the hardened layer 24 in which the working of the mounting hole 17 is difficult, the working of the mounting hole 17 is made easy.

The mounting hole 17 is formed in the intermediate of the outer race 4 in its axial direction between the outer race tracks 12 and 12. The mounting hole 17 is formed by a drill with a super-hard drill or a ceramic chip after the hardened layer 24 is formed. Noted that the hardened layer 24 is previously formed on the inner peripheral surface of the outer race 4. Although the portion of the hardened layer 24 existing closer to the inner peripheral surface exhibits a hardness of, for example, 500 Hv or more, the drill comprising the super-hard drill or the ceramic chip is enough to form the fitting hole 17. Therefore, the mounting hole 17 for fixedly supporting the sensor 18 can be formed in the outer race 4 in which its deformation is prevented by the hardened layer 24. It should be noted that when the mounting hole 17 is formed by cutting with the drill provided the super-hard drill or the ceramic chip, cooling and lubrication for the cut portion are performed by pouring cutting oil at least on the cutting portion. As the lubricant oil used at the cutting, non-aqueous oil is preferable. Since a heat generated at the time when the mounting hole 17 is formed in the hardened layer 24 is much, a working speed (rotation speed of the drill) should be slower compared to the case where a raw steel material is worked for forming a hole therein, in addition to pouring the cutting oil. Specifically, the cutting speed for making the mounting hole 17 by the drill is 20 m/min or less expressed by a speed at an outer peripheral surface of the drill, preferably 10 m/min or less, when the inner diameter of the mounting hole 17, that is, the outer diameter of the drill, is set to a range from about 11 to 13 mm. It should be noted that a cutting speed when the mounting hole 17 is formed in the raw steel material but not in the hardened layer is about at a range from about 35 to 41 m/min.

In the case of the rolling bearing unit with a rotation speed detection instrument of the present invention as described above, the wheel fixed to the flange 6 which is provided in the outer end portion of the hub body 1 can be rotatably supported on the suspension device which support the outer race 4. Furthermore, when with the rotation of the wheel the encoder 11 fixedly fitted on the inner race 2 rotates, the through holes 16 and 16 provided in the intermediate of the encoder 11 in its axial direction and the pole portions existing between the through holes 16 and 16 alternately pass through the vicinity of the detection portion provided in the tip surface of the sensor 18. As a result, the amount of the magnetic flux (density) flowing through the sensor 18 changes and the output of the sensor 18 changes. The frequency in which the output of the sensor 18 changes as described above is proportional to the rotation speed of the wheel. Therefore, if the output of the sensor 18 is sent to a controller (not show), the ABS and the TCS can be suitably controlled.

Figure 13:
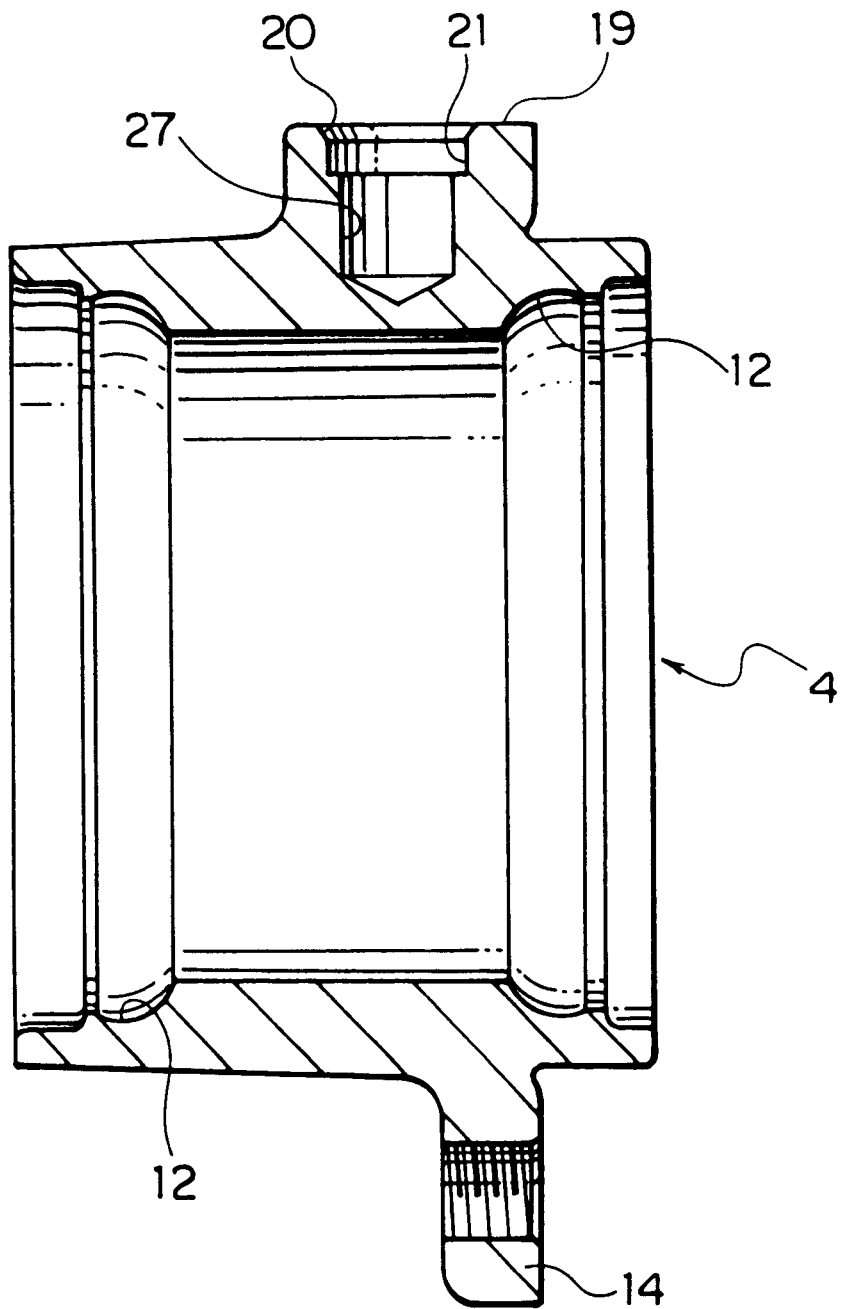
FIG. 13 shows a sixth embodiment of the present invention, which is a sectional view of an outer race before a hardened layer is formed.
Figure 14:
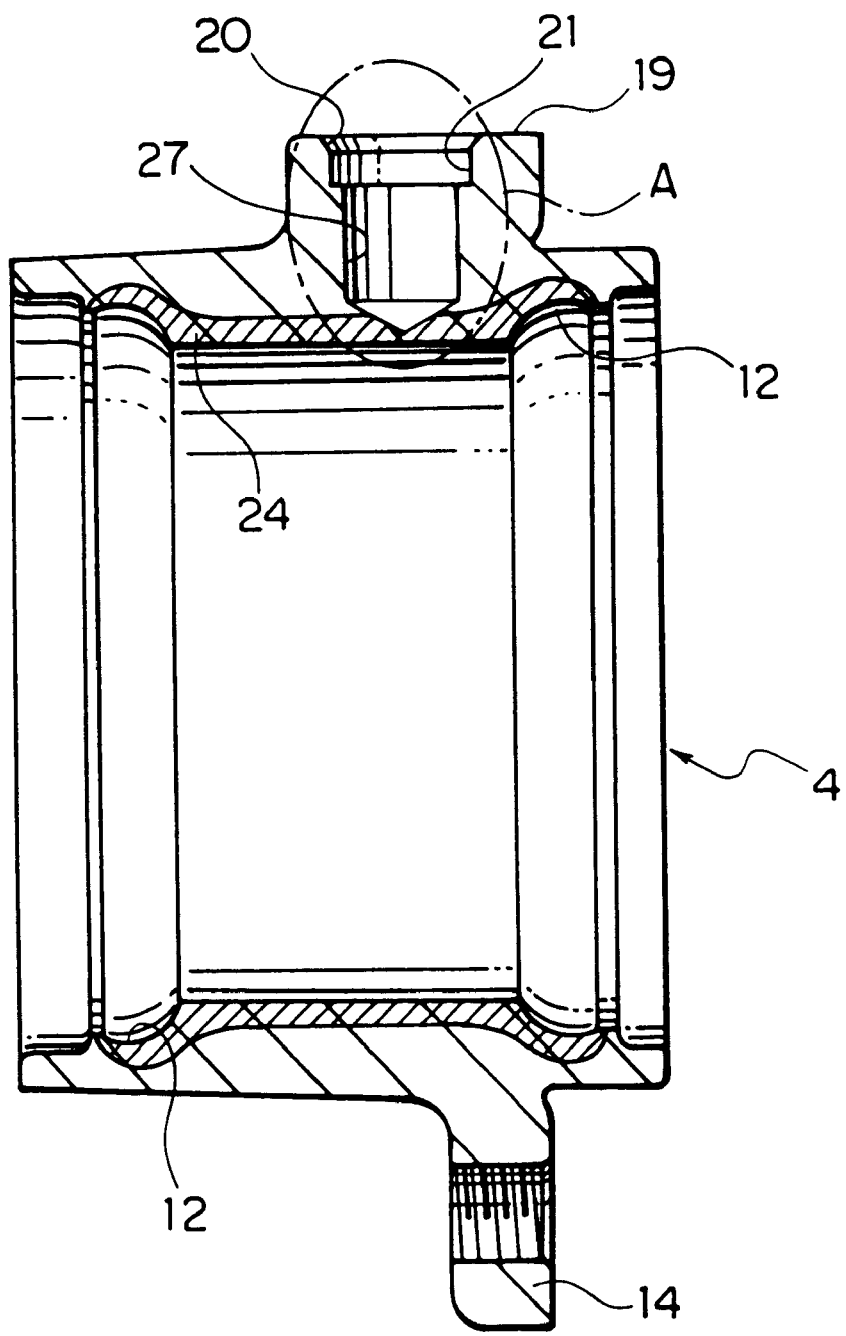
FIG. 14 is a sectional view showing a situation in which the hardened layer is formed in the outer race.
Figure 15:
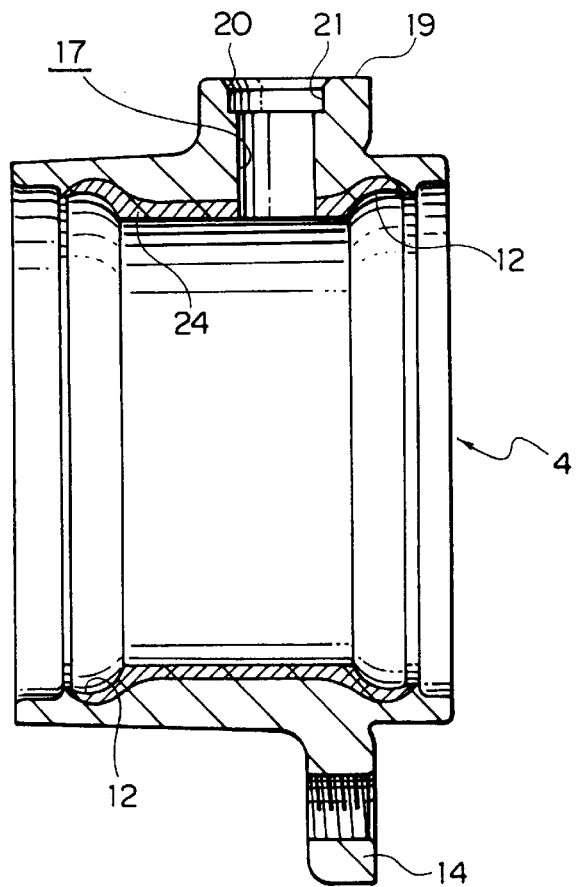
FIG. 15 is a sectional view of the outer race in which the hardened layer and a sensor mounting hole are formed.

FIGS. 13, 14 and 15 show an outer race of a sixth embodiment of the present invention. An inner race of this embodiment is the same as that of the fifth embodiment, and an illustration for it is omitted. In the case of this embodiment, the hardened layer 24 located at the portions of the outer race where the outer race tracks 12 and 12 are located and the portion located between the inner race tracks 12 and 12, is formed in a state where a concaved hole 2 having a bottom which hole is an origin of the mounting hole 17 has been formed from the outer peripheral surface side of the intermediate of the outer race 4. The mounting hole 17 is perforated thourhg to the inner peripheral surface side of the outer race 4 after the formation of the hardened layer 24.

As shown in FIG. 13, the concaved hole 27 with the bottom which is the origin of the mounting hole 17 is formed from the outer peripheral surface side of the outer race 4 to the mid way in its diameter direction, and then the outer race 4 is heated from its inner peripheral surface side while cooling the outer peripheral surface side thereof by cooling the outer race 4 with coolant such as cooling water or cooling oil, as shown in FIG. 14. Thus, as shown in FIG. 14, the hardened layer 24 is formed, which has an intermediate portion having a smaller outer diameter than other portions. Thereafter, the bottom portion of the concaved hole 27 is scraped off by a drill comprising a super-hard drill or a ceramic chip, and the mounting hole 17 which is perforated through the outer peripheral surface side to the inner peripheral surface side of the outer race 4 is formed as shown in FIG. 15. The working for the bottom portion of the concaved hole 27 must be performed using a hard tool such as a drill comprising a super-hard drill or a ceramic chip. Noted that since a working cost is low in the case of this embodiment, the working operation is easy to be performed. Furthermore, since necessity for working both of the raw steel material and the hardened portion with the same tool is less, the working with a high efficiency can be performed while preventing a clog in the tool.

As described above, in order to avoid the working of the raw steel material and the hardened portion with the same tool as possible, the relation between the thickness of the hardened layer 24 and the depth of the concaved portion 27 should be preferably regulated so that the hardened layer 24 reaches the bottom portion of the concaved hole 27. Furthermore, in order to suppress the deformation of the vicinity of the bottom portion of the concaved hole 27 as little as possible at the time of the heat treatment to form the hardened layer 24, the thickness of this bottom portion, that is, the distance from the bottom surface of the concaved hole 27 to inner peripheral surface of the outer race 4, should be secured to 1 mm or more. In the case of this embodiment, when the hardened layer 24 is formed as described above, the outer peripheral surface of the outer race 4 is cooled by coolant. However, this coolant never passes through the mounting hole 17 to reach the inner peripheral surface of the outer race 4. For this reason, it is prevented that the coolant adheres to the portion on the inner peripheral surface of the outer race 4, in which the hardened layer 24 is to be formed, thereby causing unevenness of the hardened layer 24.

Figure 16:
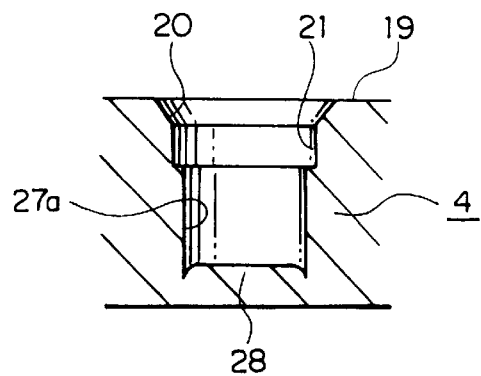
FIG. 16 shows a seventh embodiment of the present invention, which is a sectional view of the portion A of FIG. 14.

FIG. 16 shows a part of the outer race of a seventh embodiment of the present invention. The inner race of this embodiment is the same structure as that of the fifth embodiment, and an illustration and description for it are omitted. In the case of this seventh embodiment, the concaved hole 27a formed in the position, which is located in the intermediate portion of the outer race 4 in its axial direction and between the outer race tracks 12 and 12 (see FIGS. 11 to 15), has a structure so that its portion closer to the inner peripheral surface is deeper than its other portion. In the case of this seventh embodiment, the hardened layer is formed at a predetermined portion on the inner peripheral surface of the outer race 4 while cooling the outer periphery surface of the outer race 4 by coolant such as cooling water or cooling oil in a situation where the concaved hole 27a has been formed. Thereafter, the bottom portion 28 of the concaved hole 27a is punched out by a punch (not shown) in a situation where the inner peripheral surface of the outer race 4 tightly contacts a counter punch (not shown), and the mounting hole which reaches from the outer peripheral surface of the outer race 4 to the inner peripheral surface thereof is formed. It should be noted that the punch working for the bottom portion of the mounting hole can be made easier by making the inner diameter of the inner end of the mounting hole to be punched off as small as possible, according to the outer diameter of the tip end of the sensor.

FIGS. 17 to 20 show an outer race of an eighth embodiment of the present invention. An inner race of this embodiment is the same as that of the fifth embodiment, and an illustration and description for it are omitted. In the case of this embodiment, after the mounting hole 17 has been formed between the inner race tracks 12 and 12, the hardened layer 24 located in the portions where the outer race tracks 12 and 12 are formed and between the outer race tracks 12 and 12 in the inner peripheral surface of the outer race, 4 is formed in a state where the outer end opening of the mounting hole 17, that is, the opening on the outer peripheral surface side of the outer race 4, is hermetically sealed or substantially sealed by a plug 25. The hardened layer 24 is formed while cooling the outer peripheral surface of the outer race 4 by coolant such as cooling water or cooling oil.

Figure 17:
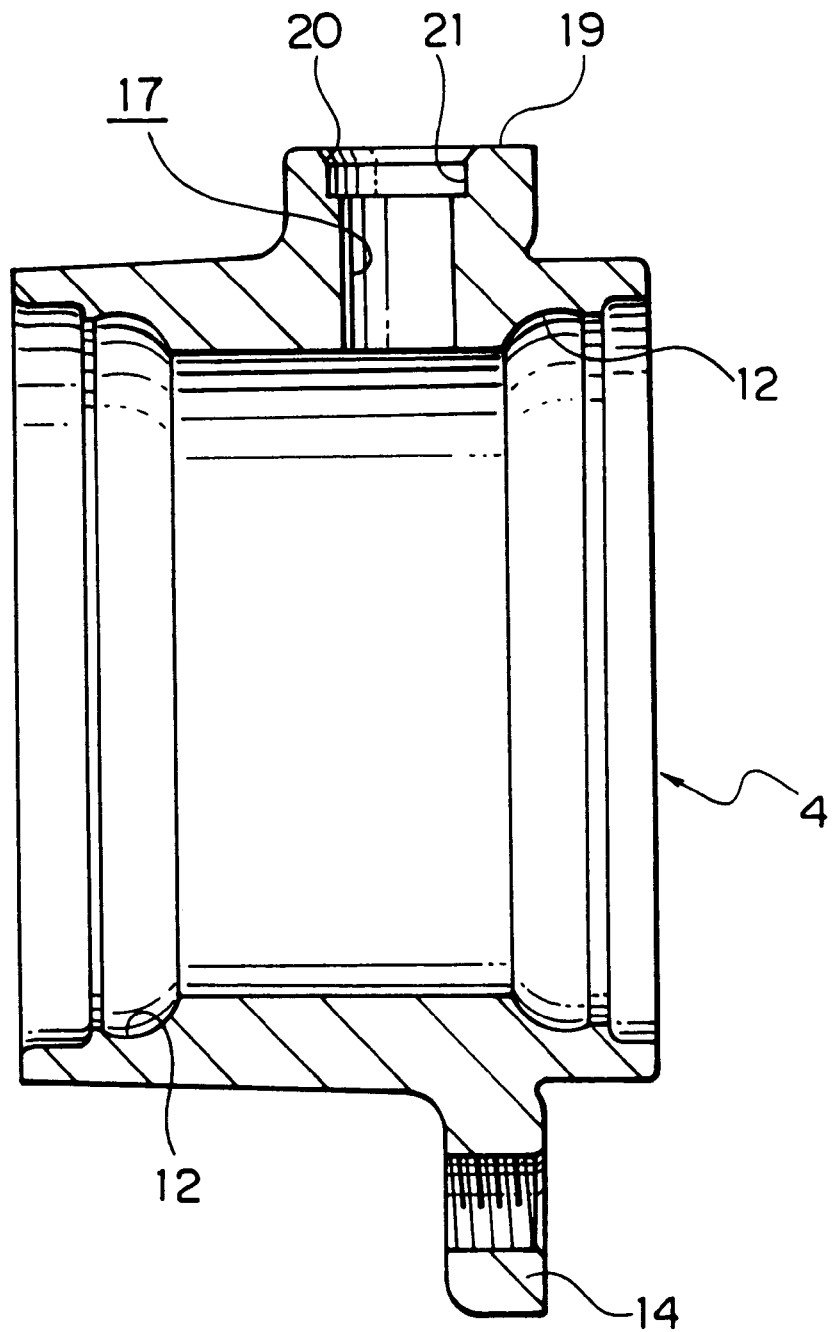
FIG. 17 shows an eighth embodiment of the present invention, which is a sectional view of an outer race before a hardened layer is formed.
Figure 18:
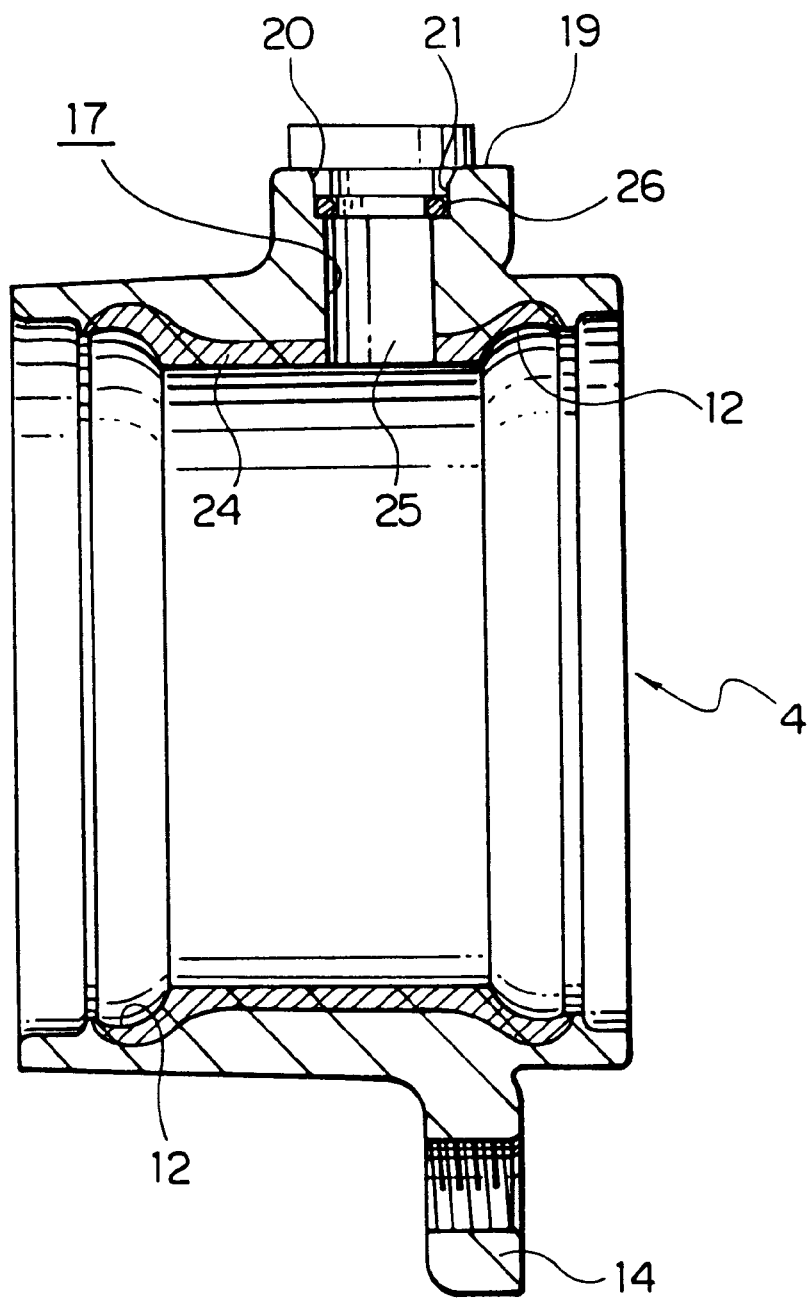
FIG. 18 is a sectional view showing a situation in which the hardened layer is formed in the outer race.
Figure 19:
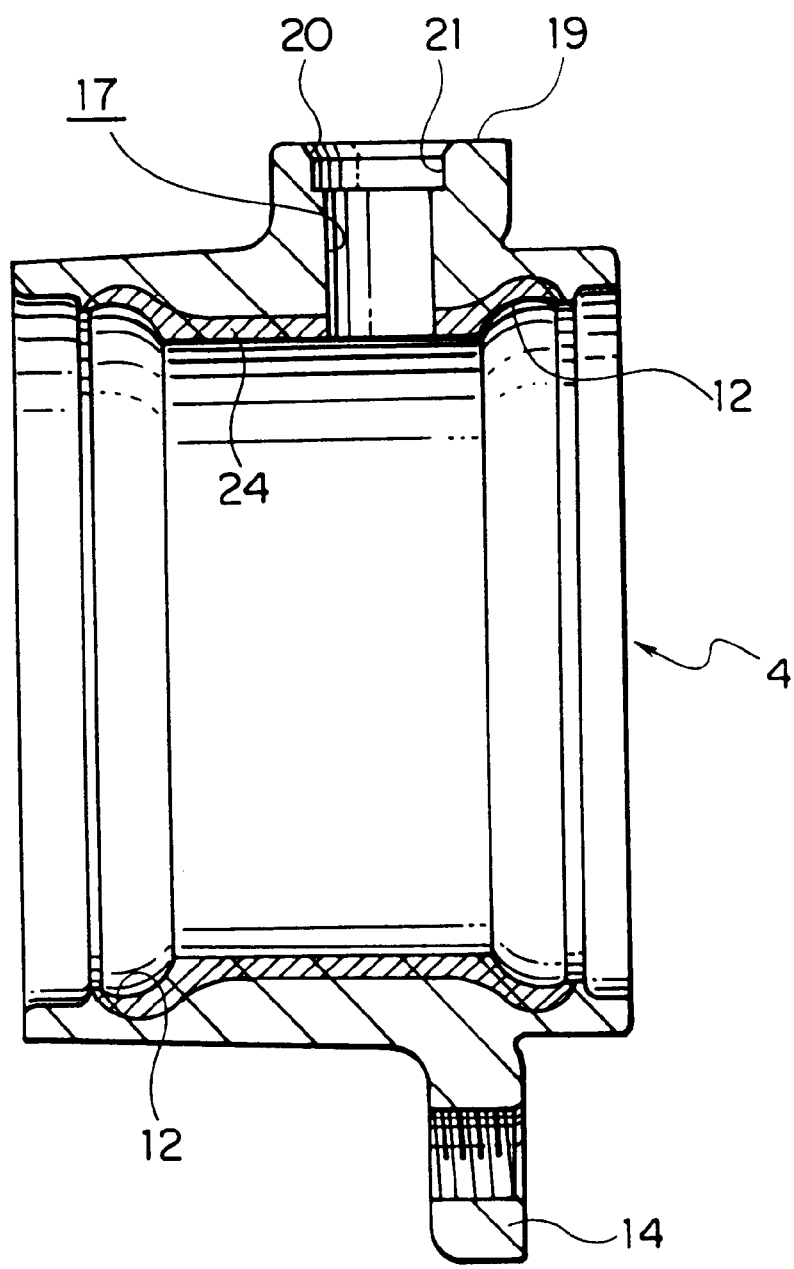
FIG. 19 is a sectional view of the outer race in which the hardened layer is formed.

Specifically, to form the hardened layer 24 and the mounting hole 17 in the outer race 4, the mounting hole 17 is formed between the outer race tracks 12 and 12 and in the intermediate portion of the outer race 4 in its axial direction in a state where a hardened layer has not yet been formed on the outer race 4 and the outer race 4 remains raw, as shown in FIG. 17. Thereafter, an electric current is flown through a heating coil (not shown) disposed inside the outer race 4 while cooling the intermediate portion of the outer peripheral surface of the outer race 4 including the vicinity of the mounting hole 17 by coolant, in a state where the mounting hole 17 is hermetically sealed or substantially sealed by a plug 25 formed of a heat resistant material such metals and ceramics, as shown in FIG. 18 whereby the inner peripheral surface of the outer race 4 is heated, and the hardened layer 24 is formed. Thereafter, by detaching the plug 25, the outer race 4 as illustrated in FIG. 19 is obtained. It should be noted that the O-ring 26 (see FIG. 18) is provided between the base portion of the plug 25 and the seat surface 21 formed in the mounting hole 17, and this disables the coolant to enter between the outer peripheral surface of the plug 25 and the inner peripheral surface of the mounting hole 17.

Figure 20:
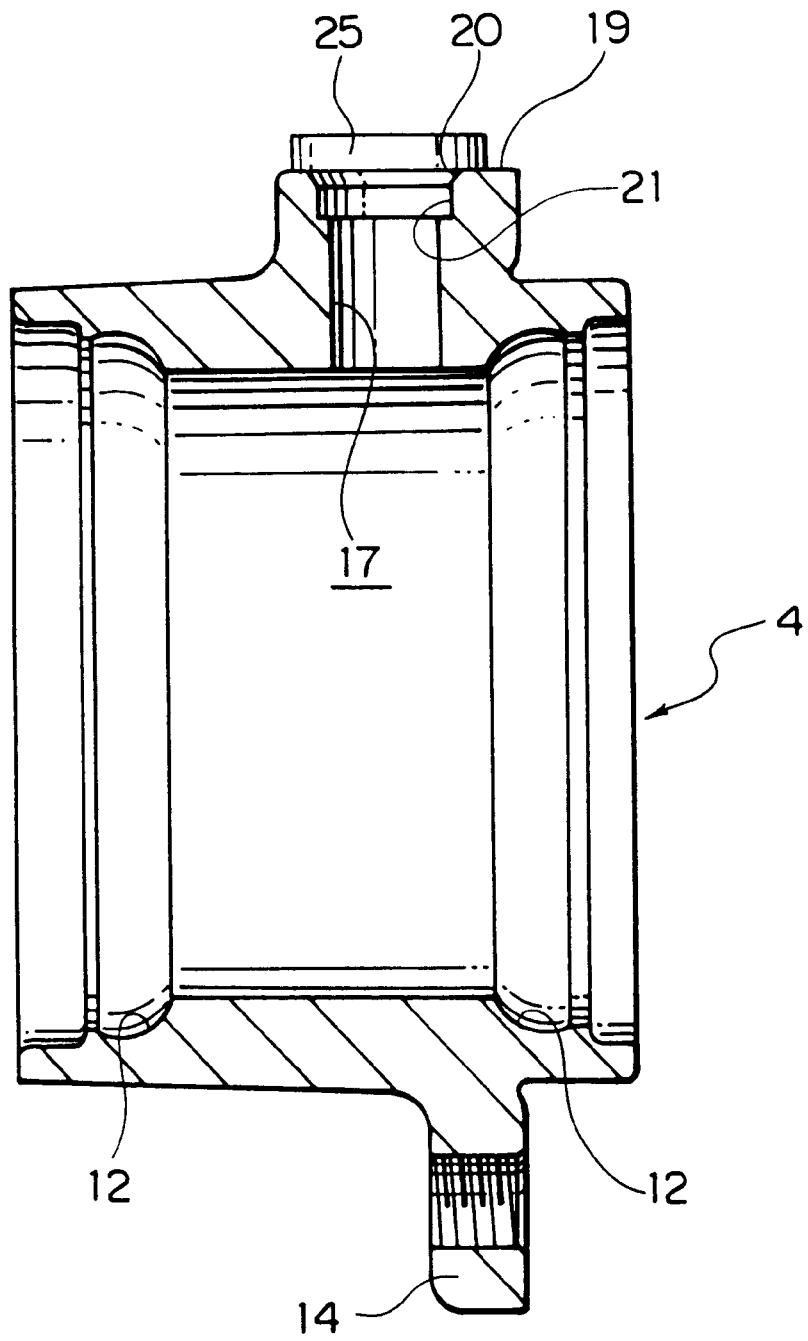
FIG. 20 is a sectional view showing another example of a plug, which is drawn similarly to FIG. 18.

Furthermore, when the plug 25 is formed of elastomer such as rubber or elastic material such as synthesis resin, the mounting hole 17 can be hermetically sealed based on elasticity of the plug 25. In such cases, as shown in FIG. 20, the dimension of the plug in its axial direction may be set to be small. Furthermore, the plug may be a plate formed of metal or synthesis resin, which does not enter the mounting hole 17, that is, the plate is larger than the mounting hole 17. Alternatively, the plug may be so shaped, that a part of the plug is loosely fit in or enter the mounting hole 17. In this case, the plate-shaped plug may be pressed against the mounting hole 17 from the outer periphery surface of the outer race 4 by a coil or a band separately provided from the plug, thus sealing the mounting hole 17. As described above, when the dimension of the plug 25 in its axial direction is set to be small, it can be prevented that a portion of the inner peripheral surface of the mounting hole 17 which portion contacts the heating coil is heated to a high temperature when an electric current is flown through to the heating coil. Therefore, even when the plug 25 is not formed of a heat-resistant material, the plug 25 is never damaged at the time of the inner peripheral surface of the outer race 4.

It should be noted that an O-ring 26 has a function to allow the plug 25 to be easily detachable in the mounting hole 17, while enabling the plug 25 to be temporarily tacked in the mounting hole 17. Furthermore, when the inner peripheral surface of the outer race 4 may be heated, the end openings of the outer race 4 may be also sealed by sealing plates (not shown) and the like, to prevent entering of the coolant inside the outer race 4. For such sealing plates, it is prevented that the coolant is attached to the portion located on the inner peripheral surface of the outer race 4, where the hardened layer 24 is to be formed, thereby causing unevenness in the hardened layer 24. In the case of this embodiment as described above, since the mounting hole 17 is formed in the foregoing intermediate portion in a state where the intermediate portion where the hardened layer 24 is not formed yet remains raw from the outer peripheral surface to the inner peripheral surface, the working of the mounting hole 17 can be easily performed.

Figure 21:
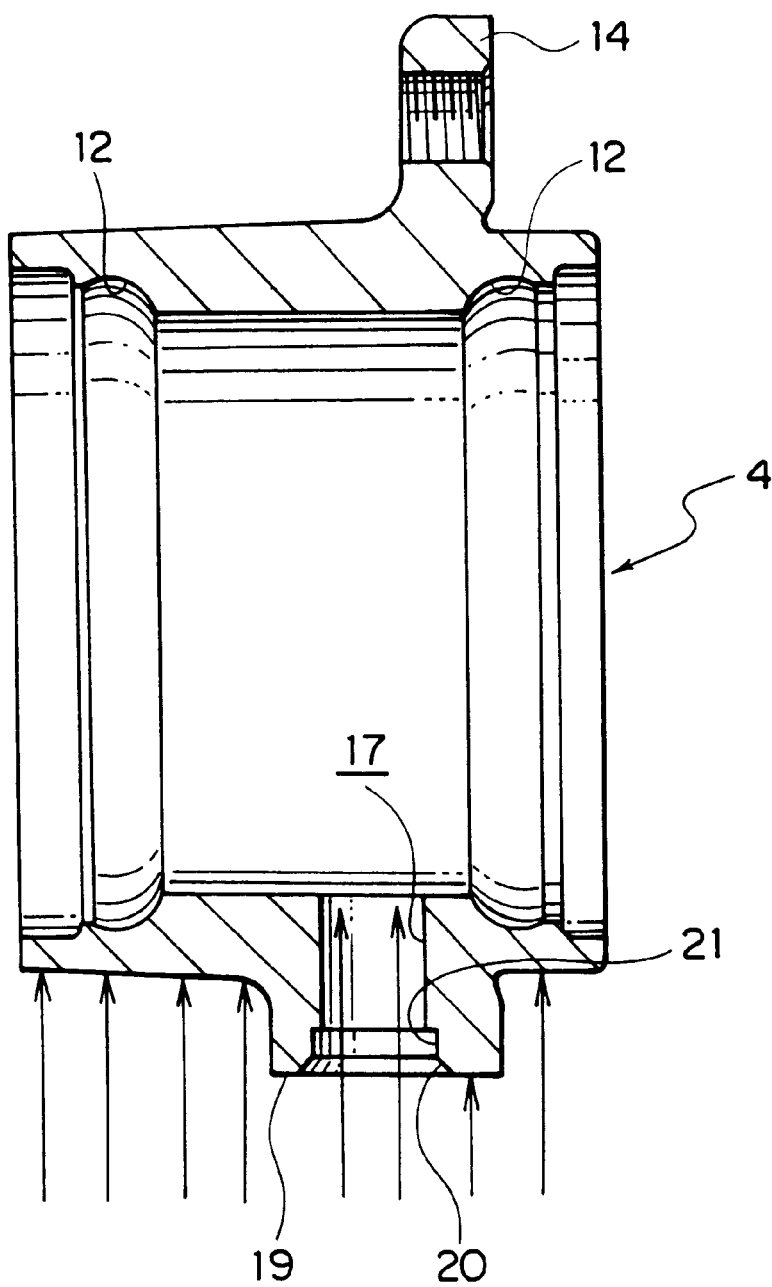
FIG. 21 shows a ninth embodiment of the present invention, which is a sectional view of an outer race.

FIG. 21 shows a ninth embodiment of the present invention. In the case of this embodiment, the mounting hole 17 is formed in the intermediate portion of the outer race 4 in its axial direction and in the portion between the outer race tracks 12 and 12, before the hardened layer is formed in the inner peripheral surface of the outer race 4. Thereafter, while rotating the outer race 4, the outer peripheral surface of the outer race 4 is cooled by liquefied coolant which is blown up as shown by the arrow of FIG. 21 upward, and at the same time the inner peripheral surface of the outer race 4 is heated, thereby forming the hardened layer. The strength of blowing-up of the liquefied coolant shown by the arrow of FIG. 21 is set to a value so that the coolant does not enter the outer race 4 through the mounting hole 17 even when the mounting hole 17 tends downward as shown in FIG. 21. Specifically, the strength of the blowing-up of the coolant is a value that though the coolant reaches the outer peripheral surface of the outer race 4 (lower surface), the coolant does not reach the inner peripheral surface of the outer race 4. Also in the case of this embodiment, in a state the foregoing intermediate portion remains raw from the outer peripheral surface to the inner peripheral surface, in which the hardened layer is not formed, the mounting hole 17 is formed in this intermediate portion, so that the working of the mounting hole 17 can be easily performed.

Furthermore, after the mounting hole is formed in the outer race, if the formation operation of the hardened layer is performed while cooling the outer peripheral surface of the outer race using gaseous coolant, the formation operation of the hardened layer can be performed without sealing the mounting hole with a plug or regulating the strength of blowing the coolant. As the gaseous coolant used in this case, low temperature nitrogen gas obtained by evaporating liquefied nitrogen can be used. When such gaseous coolant is used, though the outer race needs not to be rotated. When the outer race is not rotated, a plurality of spraying nozzles are arranged around the outer race so that the gaseous coolant is evenly sprayed on the outer peripheral surface of the outer race.

The foregoing embodiments described above using the drawings concern the case in which the present invention is applied to the rolling bearing unit for supporting driving wheels, that is, rear wheels of the FR car and the RR car, front wheels of the FF car and all wheels of the 4WD car. The present invention can be applied also to a rolling bearing unit for supporting driven wheels, that is, rear wheels of the FR car and the RR car, and rear wheels of the FF car. Furthermore, the present invention has a feature in that the formation operation of the mounting hole for fixedly supporting the sensor which is disposed in the intermediate portion of the outer race can be easily carried out. The sorts of the rotation speed detection instrument including the sensor and the encoder are not particularly limited. Therefore, the rotation speed detection instrument is not limited to the magnetic detection type such as the foregoing embodiments and other types such as eddy current type, photoelectric type can be adopted.

The rolling bearing unit of the present invention is constructed and operates as described above, so that by facilitating the working operation of the outer race constituting the rolling bearing unit with a rotation speed detection instrument, a reduction in cost of the rolling bearing unit with a rotation speed detection instrument can be achieved.

Although the preferred embodiments of the present invention have been described in detail, it should be understood that various changes, substitutions and alternations can be made therein without departing from spirit and scope of the inventions as defined by the appended claims.

What is claimed is:

1. A rolling bearing unit with a rotation speed detection instrument comprising:
   a hub rotating together with a wheel during use, the hub having a plurality of inner race tracks in an outer peripheral surface;
   an outer race formed of steel material, which is supported by a suspension device and does not rotate during use, the outer race having plural lines of outer race tracks in an inner peripheral surface which face the inner race tracks;
   rolling elements, each being rotatably provided between a respective inner race track and a corresponding outer race track;
   an encoder fixedly provided at a portion of the outer peripheral surface of the hub between the inner race tracks, the encoder exhibiting a characteristic which changes in a circumferential direction alternately at equal intervals;
   a sensor having a detecting section, the sensor being supported in a mounting hole provided in an intermediate portion of the outer face in an axial direction so that the detecting section may face the encoder and change an output signal in response to the change of the characteristic of the encoder, and
   a hardened layer being formed on the inner surface of the outer race and at each portion where the outer race tracks are formed, and
   wherein the hardened layers provided in the outer race track portions are connected to each other by a jointing hardened layer provided apart from said mounting hole in a circumferential direction, and a portion of said outer race at which said mounting hole is formed is not hardened.

2. A rolling bearing unit with a rotation speed detection instrument comprising:
   a hub rotating together with a wheel during use, the hub having a plurality of inner race tracks in an outer peripheral surface thereof;
   an outer race formed of steel material, which is supported by a suspension device and does not rotate during use, the outer race having plural lines of outer race tracks in an inner peripheral surface which face the inner race tracks;
   rolling elements, each being rotatably provided between a respective inner race track and a corresponding outer race track;

an encoder fixedly provided at a portion of the outer peripheral surface of the hub between the inner race tracks, the encoder exhibiting a characteristic which changes in a circumferential direction alternately at equal intervals; and a sensor having a detecting section, the sensor being supported in a mounting hole provided in an intermediate portion of the outer race in an axial direction so that the detecting section may face the encoder and change an output signal in response to the change of the characteristic of the encoder; and a hardened layer exhibiting a hardness of 500 Hv or more is formed in the inner surface of the outer race and at each portion where the outer race track is formed, wherein the hardened layers provided in the outer race track portions are connected to each other by a jointing hardened layer exhibiting a hardness of 500 Hv or more provided apart from said mounting hole in a circumferential direction, and a minimum distance between said mounting hole and the jointing hardened layer is at least 0.5 mm.

* * * * *

UNITED STATES PATENT AND TRADEMARK OFFICE
CERTIFICATE OF CORRECTION

PATENT NO.   : 6,568,855 B2
DATED        : May 27, 2003
INVENTOR(S)  : Matsutani et al.

It is certified that error appears in the above-identified patent and that said Letters Patent is hereby corrected as shown below:

<u>Title page,</u>
Insert Item
-- [30] Foreign Application Priority Data
      Jul. 31, 2000   (JP)………………………………..2000-231265

Signed and Sealed this

Seventh Day of October, 2003

JAMES E. ROGAN
*Director of the United States Patent and Trademark Office*